(12) United States Patent
Sugaya

(10) Patent No.: US 11,785,503 B2
(45) Date of Patent: Oct. 10, 2023

(54) COMMUNICATION APPARATUS FOR TRANSMITTING TRIGGER FRAMES AND RECEIVING MULTIPLEXED DATA FROM A PLURALITY OF APPARATUSES

(71) Applicant: SONY GROUP CORPORATION, Tokyo (JP)

(72) Inventor: Shigeru Sugaya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/871,371

(22) Filed: Jul. 22, 2022

(65) Prior Publication Data

US 2022/0361040 A1 Nov. 10, 2022

Related U.S. Application Data

(63) Continuation of application No. 16/982,160, filed as application No. PCT/JP2019/010148 on Mar. 13, 2019, now Pat. No. 11,438,798.

(30) Foreign Application Priority Data

Mar. 27, 2018 (JP) .................................. 2018-059637

(51) Int. Cl.
*H04W 28/06* (2009.01)
*H04B 7/0452* (2017.01)
(Continued)

(52) U.S. Cl.
CPC .......... *H04W 28/06* (2013.01); *H04B 7/0452* (2013.01); *H04W 52/283* (2013.01); *H04W 84/12* (2013.01); *H04W 88/16* (2013.01)

(58) Field of Classification Search
CPC ... H04W 28/06; H04W 52/283; H04W 84/12; H04W 88/16; H04W 74/06; H04W 84/18; H04B 7/0452; H04L 5/0044; H04L 5/0053

See application file for complete search history.

(56) References Cited

U.S. PATENT DOCUMENTS

2013/0294242 A1* 11/2013 Zhao ...................... H04W 72/52
370/235
2014/0050186 A1* 2/2014 Kim ....................... H04L 5/0078
370/329
(Continued)

FOREIGN PATENT DOCUMENTS

EP          3294032 A1     3/2018
JP      2016-012865 A     1/2016
(Continued)

OTHER PUBLICATIONS

International Search Report and Written Opinion of PCT Application No. PCT/JP2019/010148, dated May 28, 2019, 14 pages of English Translation and 13 pages of ISRWO.
(Continued)

*Primary Examiner* — Afshawn M Towfighi
(74) *Attorney, Agent, or Firm* — CHIP LAW GROUP

(57) ABSTRACT

The present technology relates to a communication apparatus and a communication system achieving efficient utilization of a transfer path of a wireless LAN. A communication apparatus according to an aspect of the present technology transmits a first trigger frame containing a transmission parameter used for data transmission to a plurality of apparatuses belonging to a wireless LAN, and receives data multiplexed and transmitted from the plurality of apparatuses having received the first trigger frame in accordance with the transmission parameter. In addition, the communication apparatus receives a second trigger frame transmitted
(Continued)

from a predetermined apparatus of the plurality of apparatuses, and transmits multiplexed data to the predetermined apparatus in accordance with a transmission parameter contained in the received second trigger frame. The present technology is applicable to a communication apparatus in a wireless LAN.

15 Claims, 25 Drawing Sheets

(51) Int. Cl.
*H04W 52/28* (2009.01)
*H04W 84/12* (2009.01)
*H04W 88/16* (2009.01)

(56) References Cited

U.S. PATENT DOCUMENTS

| | | | | |
|---|---|---|---|---|
| 2015/0373739 A1* | 12/2015 | Seo | ..................... | H04W 74/002 370/329 |
| 2016/0087775 A1* | 3/2016 | Hedayat | ................ | H04L 5/0055 370/329 |
| 2016/0100408 A1* | 4/2016 | Hedayat | ................ | H04W 72/21 370/329 |
| 2016/0143026 A1* | 5/2016 | Seok | ..................... | H04L 1/0025 370/329 |
| 2016/0330714 A1* | 11/2016 | Hedayat | ................ | H04L 5/0091 |
| 2017/0078052 A1* | 3/2017 | Matsuo | .................. | H04L 5/0037 |
| 2017/0171723 A1* | 6/2017 | Adachi | ............... | H04L 27/2601 |
| 2017/0244523 A1* | 8/2017 | Yang | ..................... | H04W 72/23 |
| 2018/0077723 A1 | 3/2018 | Adachi | | |
| 2018/0279171 A1 | 9/2018 | Matsuo et al. | | |
| 2019/0253201 A1* | 8/2019 | Ye | ......................... | H04W 72/23 |
| 2021/0212105 A1* | 7/2021 | Takeda | ............. | H04W 72/1268 |
| 2021/0219271 A1* | 7/2021 | Takeda | .................... | H04L 1/189 |

FOREIGN PATENT DOCUMENTS

| | | |
|---|---|---|
| JP | 2016-152503 A | 8/2016 |
| JP | 2017-055399 A | 3/2017 |
| JP | 2017-103666 A | 6/2017 |
| JP | 2018-160782 A | 10/2018 |
| WO | 2013/157164 A1 | 10/2013 |
| WO | 2016/178418 A1 | 11/2016 |

OTHER PUBLICATIONS

International Preliminary Report on Patentability of PCT Application No. PCT/JP2019/010148, dated Oct. 8, 2020, 12 pages of English Translation and 08 pages of IPRP.

Non-Final Office Action for U.S. Appl. No. 16/982,160, dated Jan. 19, 2022, 08 pages.

Notice of Allowance for U.S. Appl. No. 16/982,160, dated Apr. 29, 2022, 07 pages.

* cited by examiner

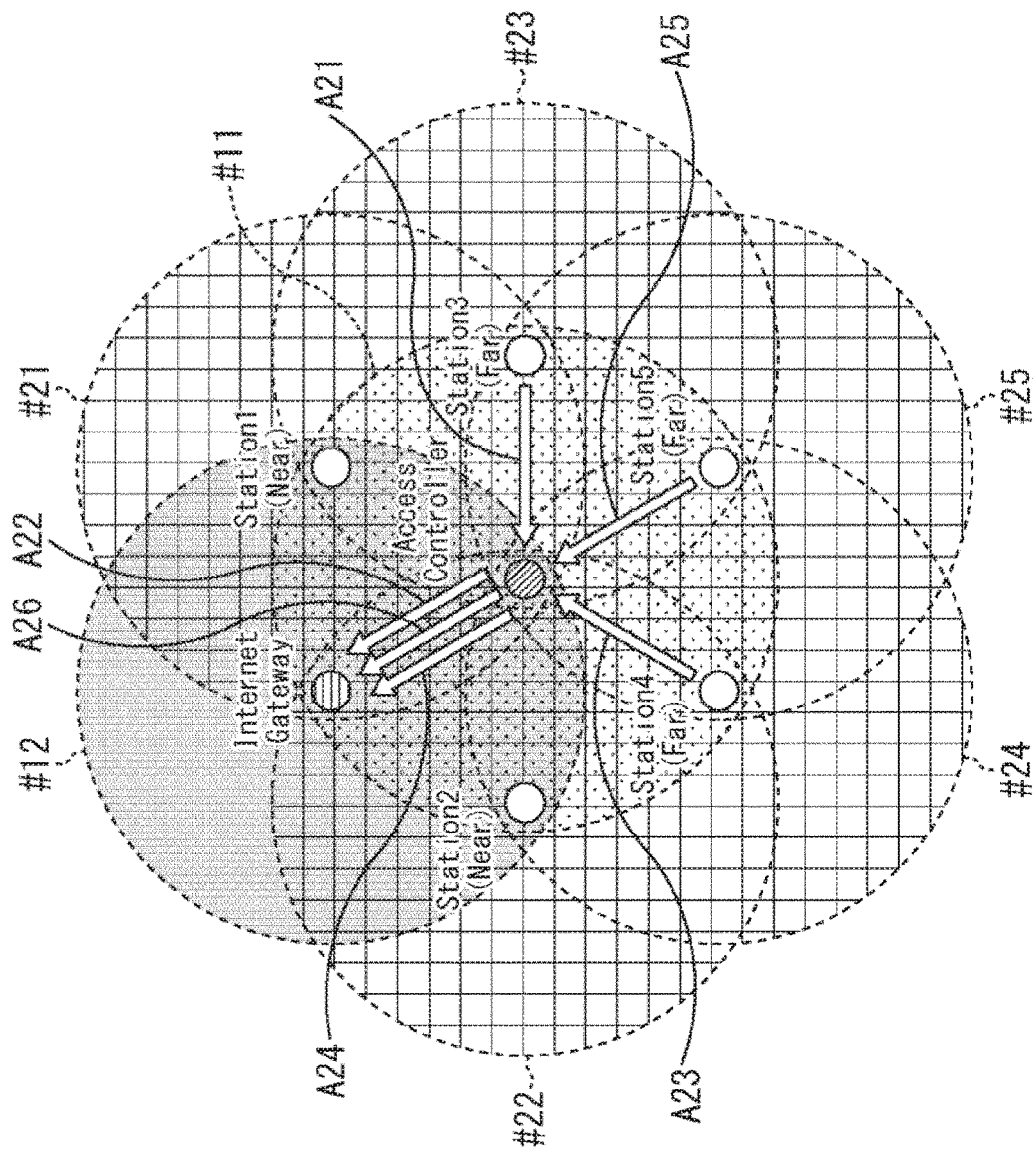
F I G. 5

F I G. 9

| IE Type | Length | ESS ID | Own MAC Address | Controller Available | Gateway Available | Intelligence Available |
|---|---|---|---|---|---|---|
| | | | Role Available Information Element | | | |

FIG. 10

| IE Type | Length | SSID | ESS ID | Controller Address | Gateway Address | Intelligence Address |
|---|---|---|---|---|---|---|
| | | | | | | |

Role Separate Information Element

F I G. 1 2

| Frame Format | | | | | | | | | | |
|---|---|---|---|---|---|---|---|---|---|---|
| MAC Header | | | | | | | | | | |
| Frame Control | Duration | Address 1 | Address 2 | Address 3 | Sequence Control | Address 4 | QoS Control | HE Control | Frame Body | FCS |

F I G . 1 7

| Frame Control | Duration | RA | TA | Common Info | User Info 1 | ... | User Info N | Padding | FCS |

Trigger Frame

FIG. 18

| Frame Control | Duration | RA | TA | Sounding Dialog Token | STA Info 1 | ... | STA Info N | FCS |

HE NDP Announcement Frame

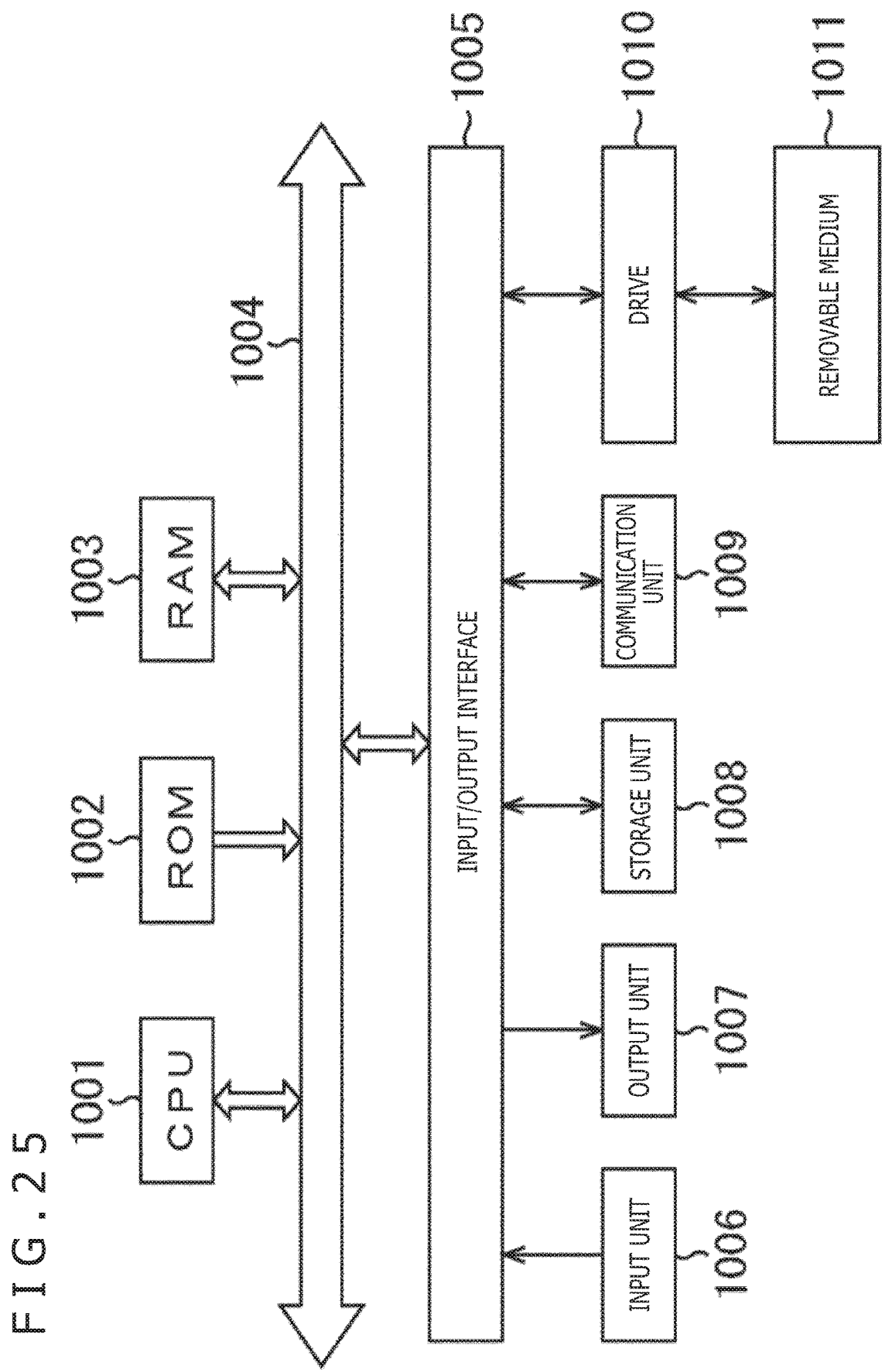

COMMUNICATION APPARATUS FOR TRANSMITTING TRIGGER FRAMES AND RECEIVING MULTIPLEXED DATA FROM A PLURALITY OF APPARATUSES

CROSS REFERENCE TO RELATED APPLICATIONS

This application is a continuation application of U.S. patent application Ser. No. 16/982,160, filed on Sep. 18, 2020, which is a U.S. National Phase of International Patent Application No. PCT/JP2019/010148, filed on Mar. 13, 2019, which claims priority benefit of Japanese Patent Application No. JP 2018-059637 filed in the Japan Patent Office on Mar. 27, 2018. Each of the above-referenced applications is hereby incorporated herein by reference in its entirety.

TECHNICAL FIELD

The present technology relates to a communication apparatus and a communication system, and particularly to a communication apparatus and a communication system achieving efficient utilization of a transfer path in a wireless LAN.

BACKGROUND ART

An access point of a wireless LAN is constituted by one communication apparatus incorporating various functions. For example, a communication apparatus operating as an access point has a modem function for managing access to the Internet, a function as a central control station for controlling communication in a wireless LAN, and a function for managing a communication apparatus connected to the wireless LAN.

In recent years, not only transfer of downlink data from an access point to a plurality of communication apparatuses by using multiuser MIMO (Multi-Input Multi-Output), but also transfer of uplink data by using multiuser MIMO has been put into practical use. In this case, the access point transmits a parameter necessary for transfer timing control or the like to each of the plurality of communication apparatuses using a trigger frame.

CITATION LIST

Patent Literature

[PTL 1]
JP 2017-103666A

SUMMARY

Technical Problems

The number of communication apparatuses each operable as an access point, such as a smartphone incorporating a function called tethering, is increasing.

In a case where one communication apparatus performs processing for uplink and downlink multiuser MIMO even in the presence of a plurality of communication apparatuses each operable as an access point in the same wireless LAN, not only concentration of loads on the one communication apparatus performing the processing, but also a drop of utilization efficiency of a transfer path may be caused.

The present technology has been developed in consideration of the aforementioned circumstances, and aims at efficient utilization of a transfer path in a wireless LAN.

Solution to Problems

A communication apparatus according to a first aspect of the present technology includes a communication control unit. The communication control unit transmits a first trigger frame containing a transmission parameter used for data transmission to a plurality of apparatuses belonging to a wireless LAN, and receives data multiplexed and transmitted from the plurality of apparatuses having received the first trigger frame in accordance with the transmission parameter. Moreover, the communication control unit receives a second trigger frame transmitted from a predetermined apparatus of the plurality of apparatuses, and transmits multiplexed data to the predetermined apparatus in accordance with a transmission parameter contained in the received second trigger frame.

A communication apparatus according to a second aspect of the present technology includes a communication control unit. The communication control unit receives a trigger frame transmitted from a first apparatus that performs a function of access control associated with access to a wireless LAN and including transmission of a beacon frame, the trigger frame containing a transmission parameter used for data transmission. In accordance with the transmission parameter contained in the received trigger frame, the communication control unit multiplexes and transmits data addressed to the first apparatus, and data transmitted via the first apparatus as a relay, and addressed to a second apparatus that performs a function of a gateway of the wireless LAN for an external network.

According to the first aspect of the present technology, the first trigger frame containing the transmission parameter used for data transmission is transmitted to the plurality of apparatuses belonging to the wireless LAN, and the data multiplexed and transmitted from the plurality of apparatuses having received the first trigger frame in accordance with the transmission parameter is received. Moreover, the second trigger frame transmitted from the predetermined apparatus of the plurality of apparatuses is received, and the multiplexed data is transmitted to the predetermined apparatus in accordance with the transmission parameter contained in the received second trigger frame.

According to the second aspect of the present technology, the trigger frame transmitted from the first apparatus that performs the function of access control associated with access to the wireless LAN and including transmission of the beacon frame is received. The trigger frame contains the transmission parameter used for data transmission. Moreover, in accordance with the transmission parameter contained in the received trigger frame, the data addressed to the first apparatus, and the data transmitted via the first apparatus as a relay, and addressed to the second apparatus that performs the function of the gateway of the wireless LAN for the external network are multiplexed and transmitted.

Advantageous Effect of Invention

According to the present technology, efficient utilization of a transfer path in a wireless LAN is achievable.

Note that advantageous effects to be produced are not limited to the advantageous effect described herein, but may be any advantageous effects described in the present disclosure.

BRIEF DESCRIPTION OF DRAWINGS

FIG. 5 is a diagram depicting a flow example of uplink data transmitted from Far Station.

FIG. 9 is a diagram depicting a configuration example of Role Available Information Element.

FIG. 10 is a diagram depicting a configuration example of Role Separate Information Element.

FIG. 12 is a diagram depicting a configuration example of a frame format used for data transmission and reception.

FIG. 17 is a diagram depicting a configuration example of a trigger frame.

FIG. 18 is a diagram depicting a configuration example of an HE NDP Announcement frame.

FIG. 25 is a block diagram depicting a configuration example of a computer.

DESCRIPTION OF EMBODIMENT

Figure 1:
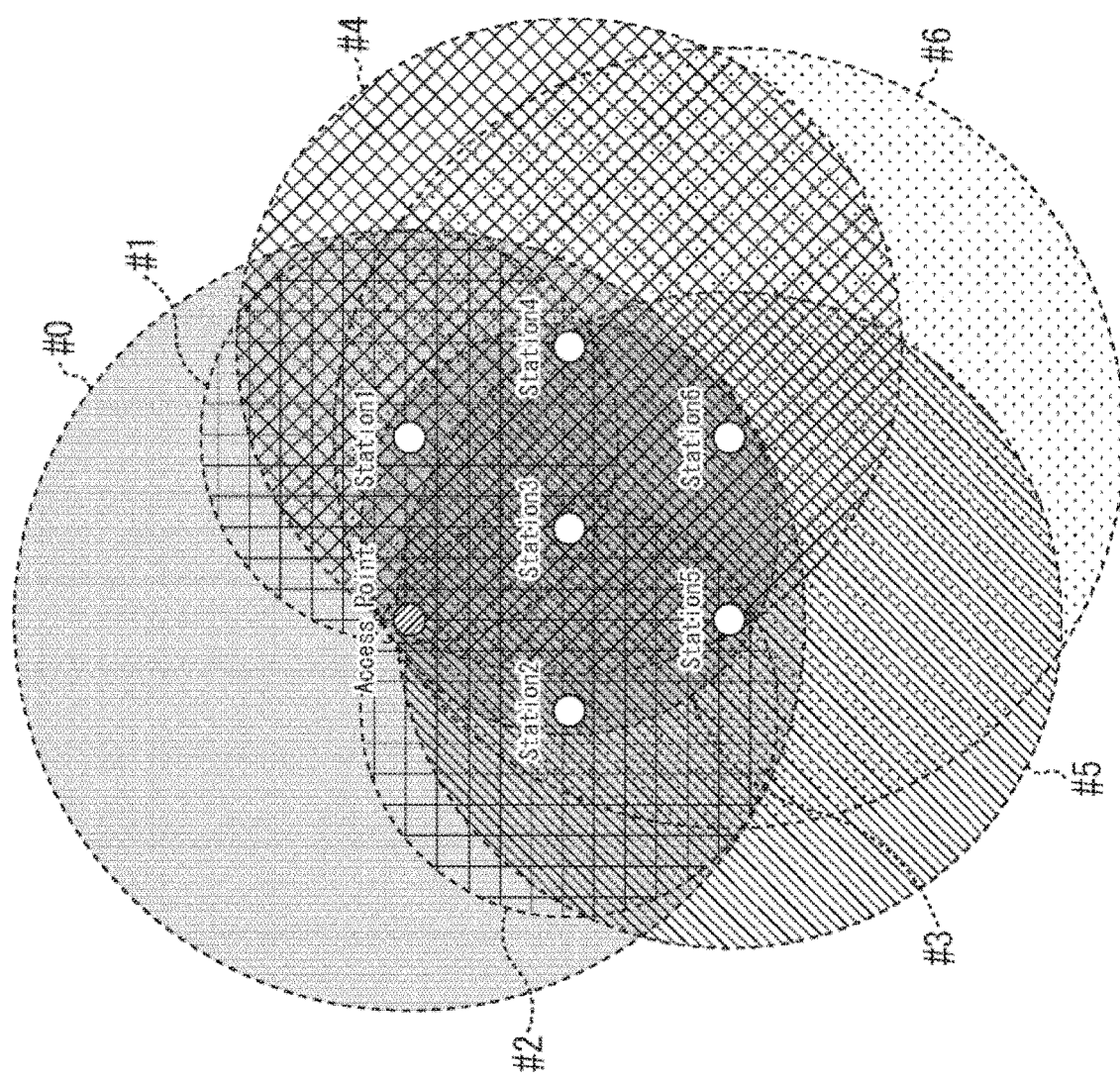
FIG. 1 is a diagram depicting a configuration example of a network in a conventional wireless LAN system.

An embodiment for practicing the present technology will be hereinafter described. The description will be presented in a following order.

1. Conventional network configuration example
2. Network configuration example according to one embodiment of present technology
3. Operation example for constituting network with shared AP function
4. Configuration example of communication apparatus
5. Operation example of overall network
6. Operations of respective communication apparatuses
7. Modifications <Conventional Network Configuration Example>

FIG. 1 is a diagram depicting a conventional network configuration example of a wireless LAN.

A configuration depicted in FIG. 1 is a configuration where all control of a network is performed by one communication apparatus. Stations 1 to 6 are located within a radio wave reach range of an access point (Access Point) which is a communication apparatus performing all control of the network. Each of small seven circles depicted in FIG. 1 indicates a communication apparatus which has a function of wireless LAN communication in conformity with predetermined specifications of IEEE802.11, for example.

Station is a communication apparatus which operates as a communication terminal belonging to a network managed by Access Point to become a client. BSS (Basic Service Set) is constituted by Access Point and Station.

A circle #0 indicated by a broken line represents a communicable range of Access Point, that is, a radio wave reach range. For example, the range represented by the circle #0 is a radio wave reach range corresponding to use of allowable maximum transmission power.

In addition, circles #1 to #6 each indicated by a broken line represent radio wave reach ranges of Stations 1 to 6, respectively. Stations 1 to 3 are located near Access Point, while Stations 4 to 6 are located far from Access Point.

As indicated by the circles #1 to #3 around Stations 1 to 3, respectively, each of Stations 1 to 3 located near Access Point is capable of communicating with Access Point even with reduced transmission power.

On the other hand, as indicated by the circles #4 to #6 around Stations 4 to 6, respectively, each of Stations 4 to 6 located away from Access Point is communicable with Access Point only when radio waves with the maximum transmission power are used without reduction of transmission power.

As described above, radio wave transmission power is difficult to reduce in communication between Access Point and Station located far from Access Point. In this case, signals reach the ranges indicated by the circles #0 and #4 to #6. More specifically, in a case where Access Point is located at an end of the network, signals reach an area out of a range containing all communication apparatuses (for example, the range of the circle #3).

Accordingly, in a case where the one communication apparatus performs all control of the network as Access Point, sufficient effects are difficult to obtain depending the position of Access Point even under reduction control of radio wave transmission power by each of the communication apparatuses.

Access Point will be hereinafter referred to as AP where appropriate. In addition, Station will be referred to as STA.

<Network Configuration Example According to One Embodiment of Present Technology>

Figure 2:
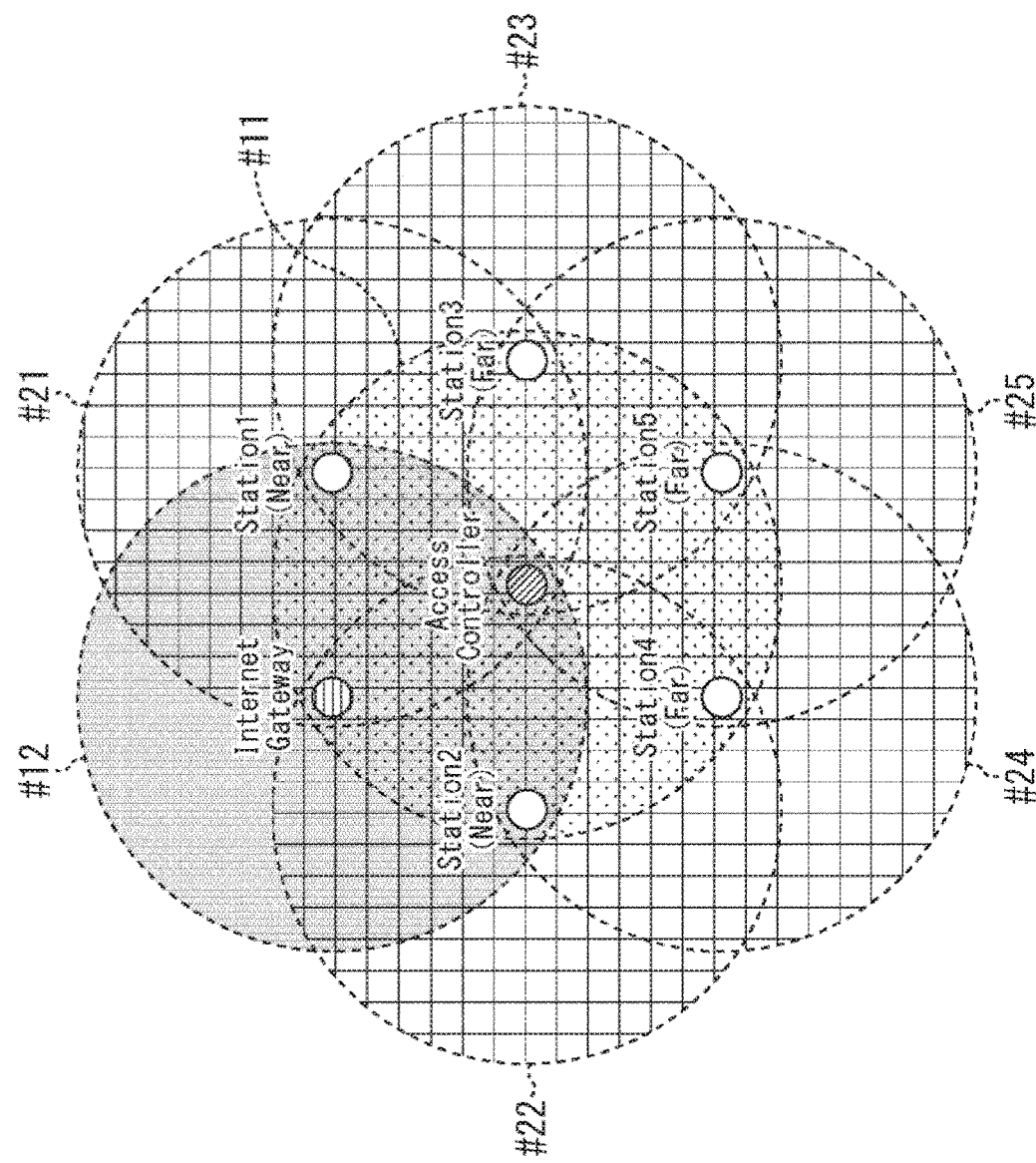
FIG. 2 is a diagram depicting a configuration example of a network with a distributed function of AP according to an embodiment of the present technology.

FIG. 2 is a diagram depicting a network configuration example with a distributed function of AP according to one embodiment of the present technology.

According to the example in FIG. 2, a communication apparatus located near a center of a network operates as Access Controller, while a communication apparatus located at an upper left position and connectable with an external network such as the Internet operates as Internet Gateway.

Accordingly, in the example in FIG. 2, the communication apparatus operating as Access Controller performs a function of network access control including transmission of a management frame in a conventional function of AP. The management frame transmitted by Access Controller includes a beacon frame, an action frame, a management frame, and a trigger frame.

As described below, the beacon frame includes information such as addresses of respective communication apparatuses constituting the network. Access to Access Controller and Internet Gateway from the respective communication apparatuses is controlled by signals transmitted from Access Controller to specify a range of the network.

In addition, the communication apparatus operating as Internet Gateway performs a gateway function for the external network in the conventional function of AP.

In the configuration where the communication apparatus different from the communication apparatus operating as Access Controller operates as Internet Gateway, STA belonging to the network is allowed to perform necessary communication such as communication via the Internet. For example, Internet Gateway communicates with a server managed by a service provider which provides connection services for connection with the Internet to control transmission and reception of uplink data and downlink data.

Uplink data is data given from STA belonging to the network to Internet Gateway or external apparatuses. Downlink data is data given from Internet Gateway or external apparatuses to STA belonging to the network.

As described above, the function of AP is shared by a plurality of communication apparatuses. Accordingly, more efficient management of the network is achievable. The function of AP includes at least a function of network access control including transmission of the beacon frame and a function of a gateway for an external network.

In addition, radio waves are only required to reach a range around Access Controller. Accordingly, each of the communication apparatuses is allowed to reduce radio wave transmission power.

For example, Access Controller is capable of transmitting signals such as the beacon frame to a range indicated by a circle #11 containing all the communication apparatuses even when radio wave transmission power is reduced.

Moreover, each of Internet Gateway and STA 1 to STA 5 is capable of communicating with Access Controller using radio waves with minimum necessary transmission power. A circle #12 represents a radio wave reach range of Internet Gateway, while circles #21 to #25 represent radio wave reach ranges of STA 1 to STA 5, respectively.

The radio wave reach range of each of the communication apparatuses is set to a range narrower than the range of the circle #0 in FIG. 1, for example, which contains the positions of the adjacent communication apparatuses. In other words, construction of a wireless LAN network is allowed in a narrow range around Access Controller.

Access Controller will be hereinafter referred to as AC where appropriate. In addition, Internet Gateway will be referred to as IG.

In the network in FIG. 2 constructed in such a narrow range, each of STA 1 and STA 2 located within a radio wave reach range of IG and capable of directly communicating with IG operates as Near Station.

In addition, each of STA 3 to STA 5 is a communication apparatus incapable of directly communicating with IG but located in a radio wave reach range of AC operates as Far Station.

Operation as Near Station or operation as Far Station is specified on the basis of a positional relation with IG.

Figure 3:
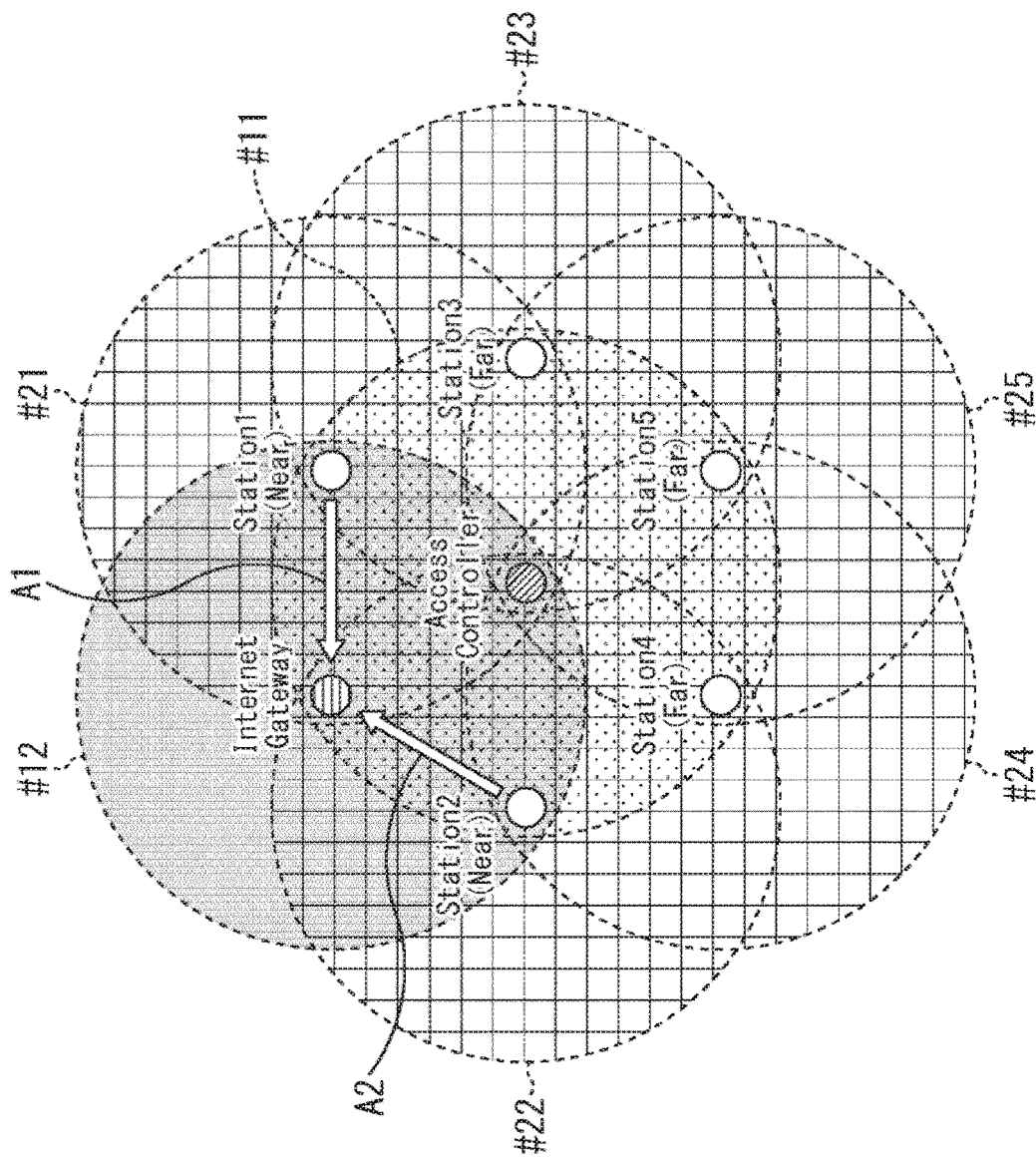
FIG. 3 is a diagram depicting a flow example of uplink data transmitted from Near Station.

FIG. 3 is a diagram depicting a flow example of uplink data transmitted from Near Station.

As indicated by a white arrow A1, uplink data to be transmitted from STA 1 as Near Station to an external apparatus is directly received by IG, and then transmitted from IG to the external apparatus corresponding to a transmission destination. The external apparatus is an apparatus connected to a network outside the network depicted in FIG. 3, such as an apparatus in the Internet.

In addition, as indicated by a white arrow A2, uplink data to be transmitted from STA 2 to an external apparatus is directly received by IG, and then transmitted from IG to the external apparatus corresponding to a transmission destination.

Figure 4:
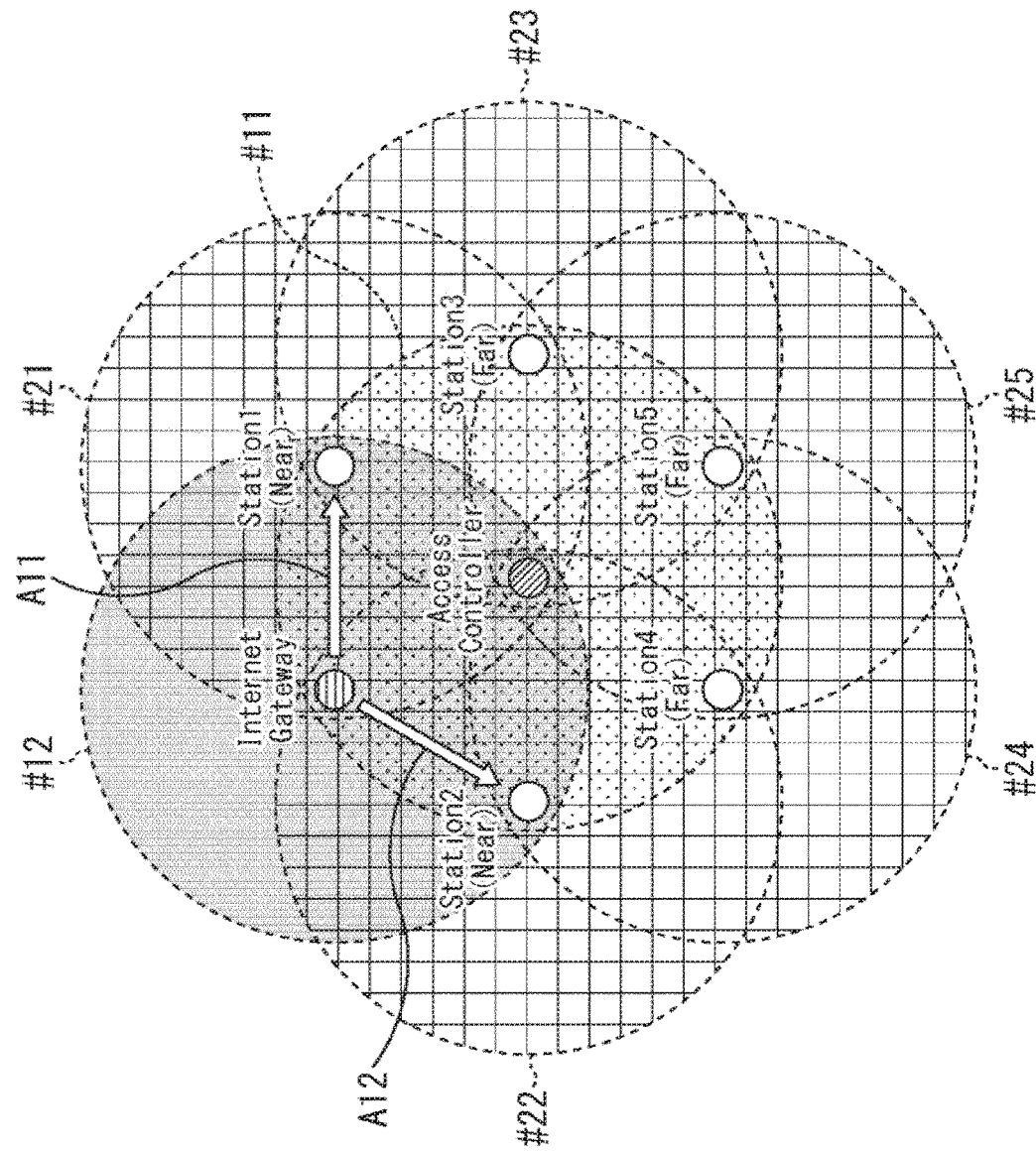
FIG. 4 is a diagram depicting a flow example of downlink data to Near Station.

FIG. 4 is a diagram depicting a flow example of downlink data to Near Station.

As indicated by a white arrow A11, downlink data transmitted from an external apparatus and received by IG as data to be transmitted to STA 1 is directly transmitted from IG to STA 1. In addition, as indicated by a white arrow A12, downlink data transmitted from an external apparatus and received by IG as data to be transmitted to STA 2 is directly transmitted from IG to STA 2.

In such a manner, each of STA 1 and STA 2 operating as Near Station is located in the radio wave reach range of IG and capable of directly communicating with IG.

FIG. 5 is a diagram depicting a flow example of uplink data transmitted from Far Station.

As indicated by white arrows A21 and A22, uplink data to be transmitted from STA 3 as Far Station to an external apparatus is received by IG via AC as a relay, and then transmitted from IG to the external apparatus corresponding to a transmission destination.

In addition, as indicated by white arrows A23 and A24 and white arrows A25 and A26, each uplink data to be transmitted from STA 4 and STA 5 to an external apparatus is received by IG via AC as a relay, and then transmitted from IG to the external apparatus corresponding to a transmission destination.

Figure 6:
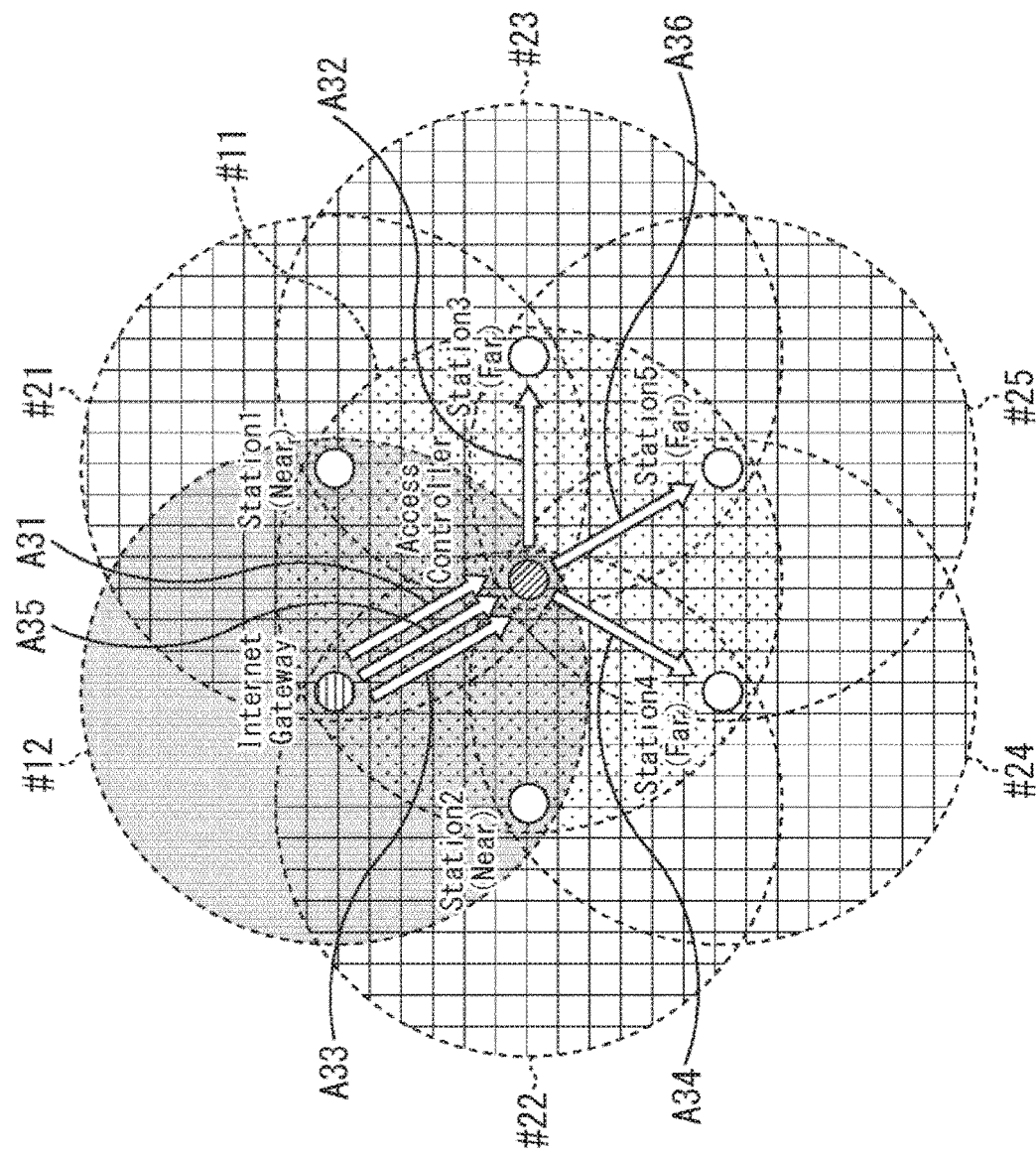
FIG. 6 is a diagram depicting a flow example of downlink data to Far Station.

FIG. 6 is a diagram depicting a flow example of downlink data to Far Station.

As indicated by white arrows A31 and A32, downlink data transmitted from an external apparatus and received by IG as data to be transmitted to STA 3 is transmitted from IG to STA 3 via AC as a relay.

In addition, as indicated by white arrows A33 and A34 and white arrows A35 and A36, each downlink data transmitted from an external apparatus and received by IG as data to be transmitted to STA 4 and STA 5 is transmitted from IG to STA 4 and STA 5 via AC as a relay.

In such a manner, each of STA 3, STA 4, and STA 5 each operating as Far Station is located in the radio wave reach range of AC, and therefore is capable of communicating with IG via AC as a relay.

In the network where the function of AP is shared by a plurality of communication apparatuses, transmission and reception of uplink/downlink data are performed in the manner described above.

Accordingly, in the configuration where the communication apparatus operable as AC and located at an optimum position performs a part of the conventional function of AP, an efficient network can be constructed in a necessary and sufficient range desired by a user.

More specifically, communication between the respective communication apparatuses is efficiently performed in the manner described above by designating the communication apparatus located near the center of the range desired by the user as an apparatus performing the function of AC.

Moreover, in the configuration where the communication apparatus operable as IG performs a part of the conventional function of AP, an operation optimized for access to the Internet network is achievable by this communication apparatus.

<Operation Example for Constituting Network with Shared AP Function>

Described here will be an operation of a network where the function of AP is shared by a plurality of communication apparatuses in the manner described above.

Figure 7:
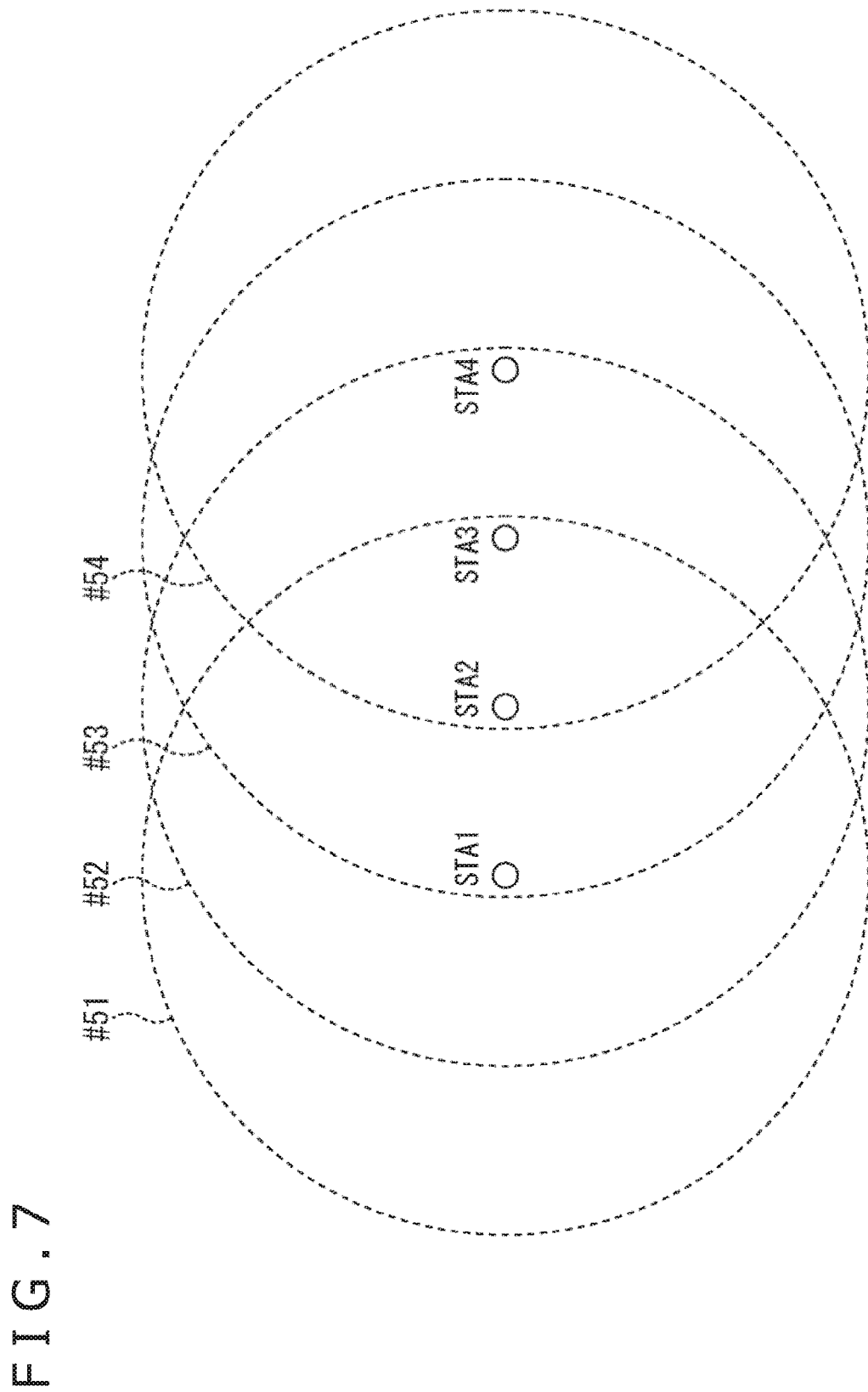
FIG. 7 is a diagram depicting an example of a positional relation between communication apparatuses.

It is assumed in the following description that STA 1 to STA 4 are arranged in this order from the left as depicted in FIG. 7. Circles #51 to #54 represent radio wave reach ranges of STA 1 to STA 4, respectively.

According to this example, each STA is capable of directly communicating with the second station away, but is uncapable of communicating with STA located farther. More specifically, STA 1 and STA 4 are unable to communicate with each other.

Each STA capable of performing the function of AP can exchange information with surrounding STA using an action frame or the like containing information which indicates a function allowed to be performed by corresponding STA.

Initially described with reference to a sequence in FIG. 8 will be a series of operations for distributing the function of AP and determining roles of respective STAs. While an operation using an action frame and a beacon frame is described here for convenience, a management frame may be used instead of these frames.

Suppose here that STA 2 operable as AC is designated as a station operating as AC by the user. For example, designation of operation as AC is achieved by manipulating STA 2.

In a case where STA 2 is designated as the station operating as AC, STA 2 transmits an action frame containing Role Available Information Element in step S11. Information indicating own operability as AC is described in Role Available Information Element contained in the action frame transmitted by STA 2.

The action frame transmitted from STA 2 is received by STA 1 in step S1, and received by STA 3 in step S21. In addition, the action frame transmitted from STA 2 is received by STA 4 in step S31.

Suppose that STA 1, for example, in STAs having received the action frame transmitted from STA 2 is a communication apparatus capable of connecting to the Internet.

In this case, STA 1 transmits an action frame containing Role Available Information Element in step S2. Information indicating own operability as IG is described in Role Available Information Element contained in the action frame transmitted by STA 1.

The action frame transmitted from STA 1 is received by STA 2 in step S12, and received by STA 3 in step S22. STA 1 and STA 4 are unable to directly communicate with each other. Accordingly, the action frame transmitted from STA 1 does not reach STA 4.

STA 2 operating as AC determines that the network with the distributed function of AP is manageable on the basis of reception of the action frame transmitted from STA 1 operating as IG.

In step S13, STA 2 transmits a beacon frame containing Role Separate Information Element. Information indicating roles performed by respective STAs is described in Role Separate Information Element contained in the beacon frame transmitted from STA 2.

STA 2 having transmitted the beacon frame implements setting for operating as AC in step S14.

The beacon frame transmitted from STA 2 is received by STA 1 in step S3, and received by STA 3 in step S23. In addition, the beacon frame transmitted from STA 2 is received by STA 4 in step S32.

STA 1 having received the beacon frame transmitted from STA 2 in step S3 implements setting for operating as IG in step S4.

On the other hand, STA 3 having received the beacon frame transmitted from STA 2 in step S23 is considered to have received both a signal transmitted from STA 2 operating as AC and a signal transmitted from STA 1 operating as IG with predetermined electric field intensity or higher.

In this case, STA 3 implements setting for operating as Near Station in step S24. STA 3 directly transmits and receives uplink/downlink data to and from IG.

In addition, STA 4 having received the beacon frame transmitted from STA 2 in step S32 has received a signal transmitted from STA 2 operating as AC with predetermined electric field intensity or higher, but does not receive a signal transmitted from STA 1 operating as IG.

STA 4 is located out of a direct reach range of a signal from STA 1. Accordingly, STA 4 implements setting for operating as Far Station in step S33. STA 4 transmits and receives uplink/downlink data via AC as a relay.

FIG. 9 is a diagram depicting a configuration example of Role Available Information Element.

As depicted in FIG. 9, Role Available Information Element contains IE Type, Length, ESS ID, Own MAC Address, Controller Available, Gateway Available, and Intelligence Available.

IE type represents a format of an information element.

Length represents an information length of an information element.

ESS ID represents an identifier of an extension service set as necessary.

Own MAC Address represents an own MAC address.

Controller Available is a flag indicating operability or non-operability as AC. According to the example in FIG. 8, a setting value indicating that STA 2 is operable as AC is given to Controller Available of Role Available Information Element contained in the action frame transmitted from STA 2.

Gateway Available is a flag indicating operability or non-operability as IG. According to the example in FIG. 8, a setting value indicating that STA 1 is operable as IG is given to Gateway Available of Role Available Information Element contained in the action frame transmitted from STA 1.

Intelligence Available is a flag indicating operability or non-operability as Intelligence Controller. A communication apparatus functioning as Intelligence Controller performs an authentication process of the network and a process concerning association with the network. More specifically, Intelligence Controller has a function for performing an authentication function of the network and a function for processing a request for association with the network in the conventional function of AP.

In such a manner, the function of AP may be further subdivided to distribute a part of the function of AP to another communication apparatus. In a case of distribution of the function of Intelligence Controller, STA operable as Intelligence Controller transmits an action frame containing Role Available Information Element which has a setting value indicating own operability as Intelligence Controller as a value of Intelligence Available.

Each STA is capable of presenting a function allowed to be performed by corresponding STA to another STA by using an action frame containing the respective items of information depicted in FIG. 9. In addition, each STA is capable of checking the presence or absence of STA providing the function of AP performed by corresponding STA within the network to which corresponding STA belongs on the basis of an action frame transmitted from another STA.

FIG. 10 is a diagram depicting a configuration example of Role Separate Information Element.

As depicted in FIG. 10, Role Separate Information Element contains IE Type, Length, SSID, ESS ID, Controller Address, Gateway Address, and Intelligence Address. IE Type, Length, and ESS ID are identical to IE Type, Length, and ESS ID described with reference to FIG. 9, respectively. SSID is a service set identifier set as necessary.

Controller Address represents an address of STA operating as AC.

Gateway Address represents an address of STA operating as IG.

Intelligence Address represents an address of STA operating as Intelligence Controller.

Figure 8:
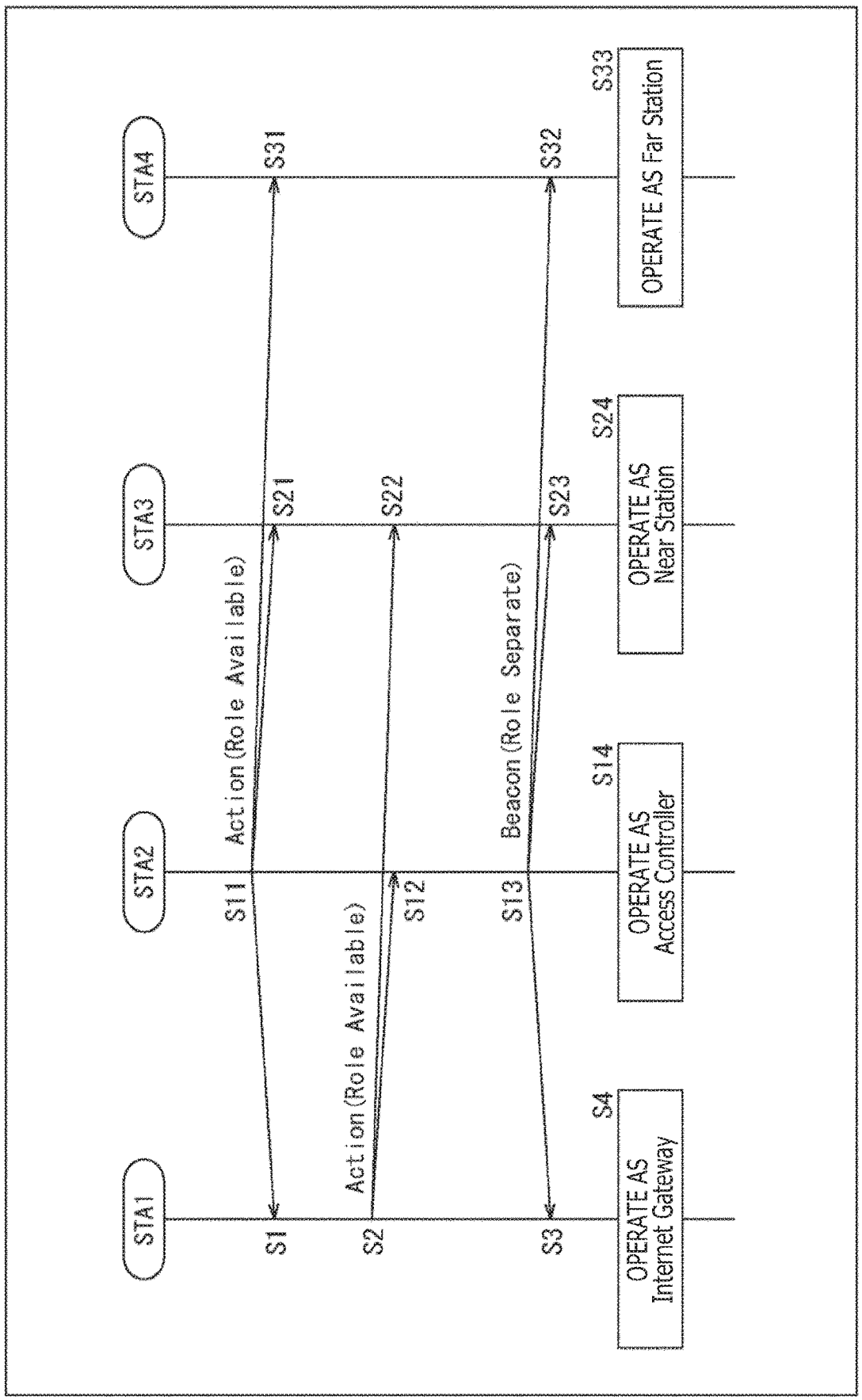
FIG. 8 is a sequence diagram explaining a series of operations for determining roles of communication apparatuses.

According to the example in FIG. 8, a setting of an own address of STA 2 is given to Controller Address of Role Separate Information Element contained in a beacon frame transmitted from STA 2, while a setting of an address of STA 1 is given to Gateway Address. For example, the address of STA 1 set as Gateway Address is specified at STA 2 on the basis of Own MAC Address of Role Available Information Element of the action frame transmitted from STA 1.

STA operating as AC is capable of presenting addresses of STAs performing the function of AP to other STAs by using a beacon frame containing respective items of information depicted in FIG. 10. In addition, each of STAs is capable of specifying addresses of other STAs performing the function of AP and belonging to the network to which corresponding STA belongs on the basis of a beacon frame transmitted from STA operating as AC.

A plurality of functions of AP may be performed by one STA. In this case, a setting of an address of identical STA is given to two or more of Controller Address, Gateway Address, and Intelligence Address.

In addition, a plurality of addresses of IG may be described in Role Separate Information Element. In a case where a plurality of STAs operable as IG is present in one network, a beacon frame containing Role Separate Information Element where the respective addresses are described is transmitted from AC.

At the time of determination of roles of STAs, an action frame containing Role Available Information Element as management information and a beacon frame containing Role Separate Information Element as management information as described above are transmitted and received between respective STAs.

Figure 11:
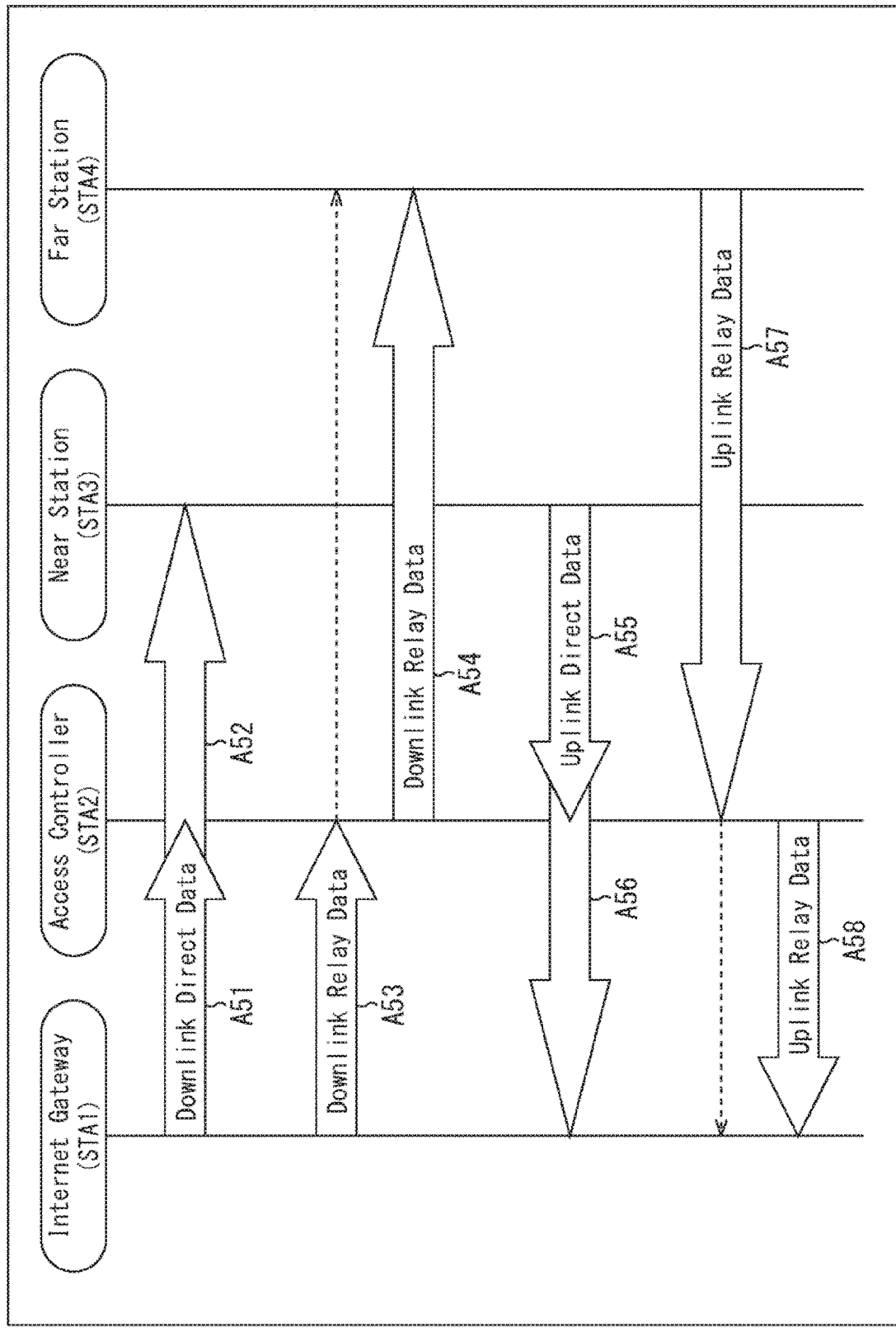
FIG. 11 is a sequence diagram explaining a flow of communication between communication apparatuses.

A flow of communication between STAs will be described next with reference to a sequence in FIG. 11.

It is assumed that STA 1, STA 2, STA 3, and STA 4 implement setting for operating as IG, AC, Near Station, and Far Station, respectively, by performing the processing described with reference to FIG. 8.

As indicated by white arrows A51 and A52, respectively, data addressed to AC and data addressed to Near Station both transmitted from IG are directly transmitted to AC and Near Station, respectively, as Downlink Direct Data.

On the other hand, as indicated by a white arrow A53, data addressed to Far Station and transmitted from IG is transmitted from IG to AC as Downlink Relay Data. Thereafter, as indicated by a white arrow A54, this data is transmitted to Far Station via AC as a relay. In FIG. 11, a broken arrow located after the white arrow A53 indicates that data transmitted from IG does not directly reach Far Station.

As indicated by white arrows A55 and A56, respectively, data addressed to AC and data addressed to IG both transmitted from Near Station are directly received by AC and IG, respectively, as Uplink Direct Data.

On the other hand, as indicated by a white arrow A57, data addressed to IG and transmitted from Far Station is received by AC as Uplink Relay Data. Thereafter, as indicated by a white arrow A58, the data is transmitted to IG via AC as a relay.

FIG. 12 is a diagram depicting an example of a format of a data frame used for transmission and reception of data.

As depicted in FIG. 12, a data frame includes MAC Header, Frame Body, and FCS.

MAC Header includes fields such as Frame Control, Duration, Address 1, Address 2, Address 3, Sequence Control, Address 4, QoS Control, and HE Control.

Control information and a format associated with a frame are described in Frame Control.

Duration of the frame and duration for returning a response are described in Duration.

Described in each of Address 1, Address 2, Address 3, and Address 4 is BSS ID or the like which indicates an address of STA corresponding to a relay or an address of an access point, as well as an address of STA corresponding to a transmitter or an address of STA corresponding to a receiver at the time of execution of direct transfer.

A parameter associated with a sequence number or the like is described in Sequence Control.

A parameter associated with QoS is described in QoS Control.

A parameter for performing efficient transfer is described in HE Control.

Frame Body contains data associated with a transmission target.

A parameter for detecting an error of MAC Header is described in FCS.

<Configuration Example of Communication Apparatus>

Figure 13:
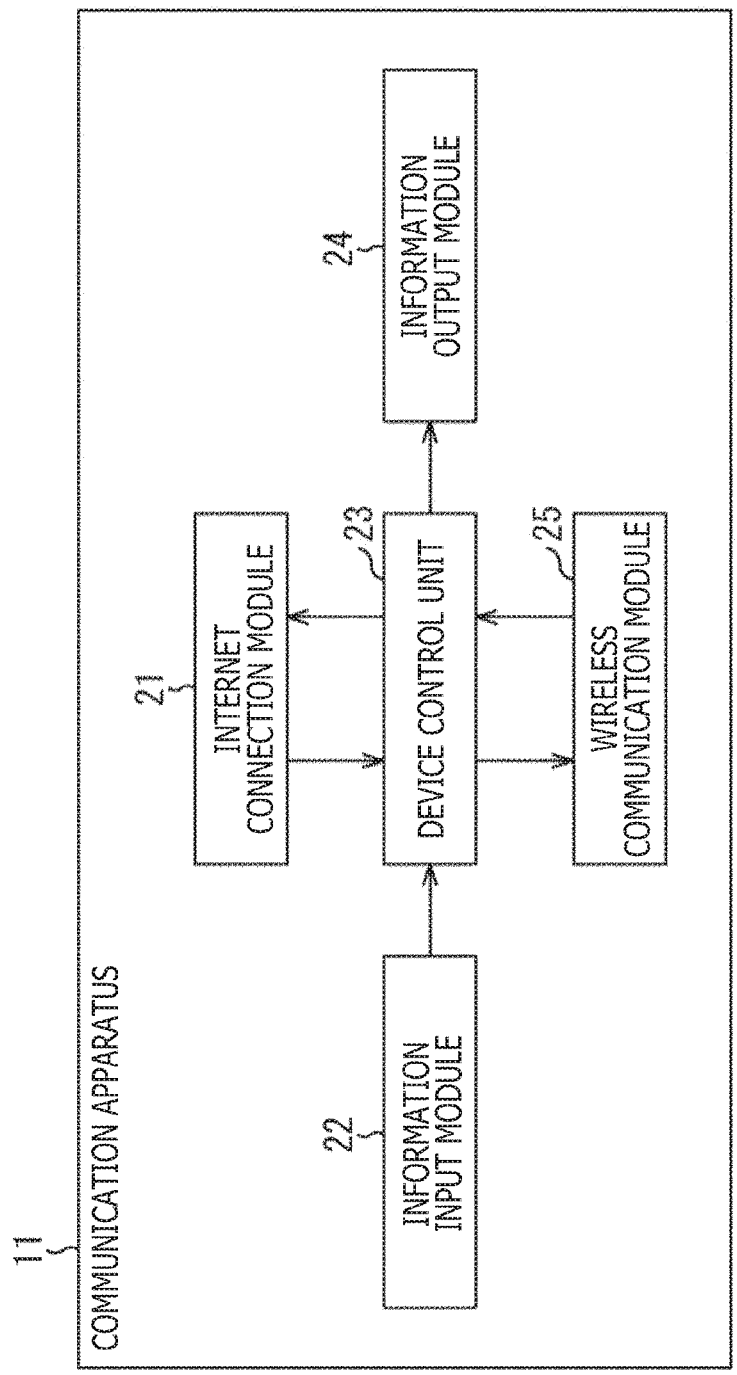
FIG. 13 is a block diagram depicting a configuration example of a communication apparatus.

FIG. 13 is a block diagram depicting a configuration example of a communication apparatus.

A communication apparatus 11 depicted in FIG. 13 is STA which operates as AC, IG, IC (Intelligence Controller), Near Station, Far station, or the like.

For example, the communication apparatus 11 includes an Internet connection module 21, an information input module 22, a device control unit 23, an information output module 24, and a wireless communication module 25. Some parts in the configuration depicted in FIG. 13 may be eliminated as necessary depending on a function performed by the corresponding communication apparatus 11.

In a case where the communication apparatus 11 operates as IG, the Internet connection module 21 functions as a communication modem for connection to the Internet. More specifically, the Internet connection module 21 outputs data received via the Internet to the device control unit 23, and transmits data supplied from the device control unit 23 to an apparatus corresponding to a transmission destination via the Internet.

The information input module 22 detects a manipulation performed by the user, and outputs information indicating contents of the manipulation by the user to the device control unit 23. For example, in a case where a button, a keyboard, a touch panel, or the like provided on a housing of the communication apparatus 11 is manipulated, the information input module 22 outputs a signal corresponding to the manipulation performed by the user to the device control unit 23.

The device control unit 23 includes a CPU (Central Processing Unit), a ROM (Read Only Memory), a RAM (Random Access Memory), and the like. The device control unit 23 executes a predetermined program using the CPU, and controls an overall operation of the communication apparatus 11 according to a signal or the like supplied from the information input module 22.

For example, the device control unit 23 outputs downlink data supplied from the Internet connection module 21 to the wireless communication module 25, and causes the wireless communication module 25 to transmit the data to a communication apparatus corresponding to a transmission destination. Moreover, the device control unit 23 acquires, from the wireless communication module 25, uplink data transmitted from a communication apparatus belonging to the network and received by the wireless communication module 25, and outputs the uplink data to the Internet connection module 21. The device control unit 23 causes the information output module 24 to output predetermined information as necessary.

The information output module 24 includes a display unit constituted by a liquid crystal panel or the like, a speaker, an LED (Light Emitting Diode), and the like. The information output module 24 outputs various types of information such as information indicating an operation state of the communication apparatus 11, and information acquired via the Internet on the basis of information supplied from the device control unit 23 to present the information to the user.

The wireless communication module 25 is a wireless LAN module in conformity with predetermined specifications. For example, the wireless communication module 25 is constituted by an LSI chip.

The wireless communication module 25 transmits data supplied from the device control unit 23 to another apparatus in the form of a predetermined format frame, and receives a signal transmitted from another apparatus to output data extracted from the received signal to the device control unit 23.

Figure 14:
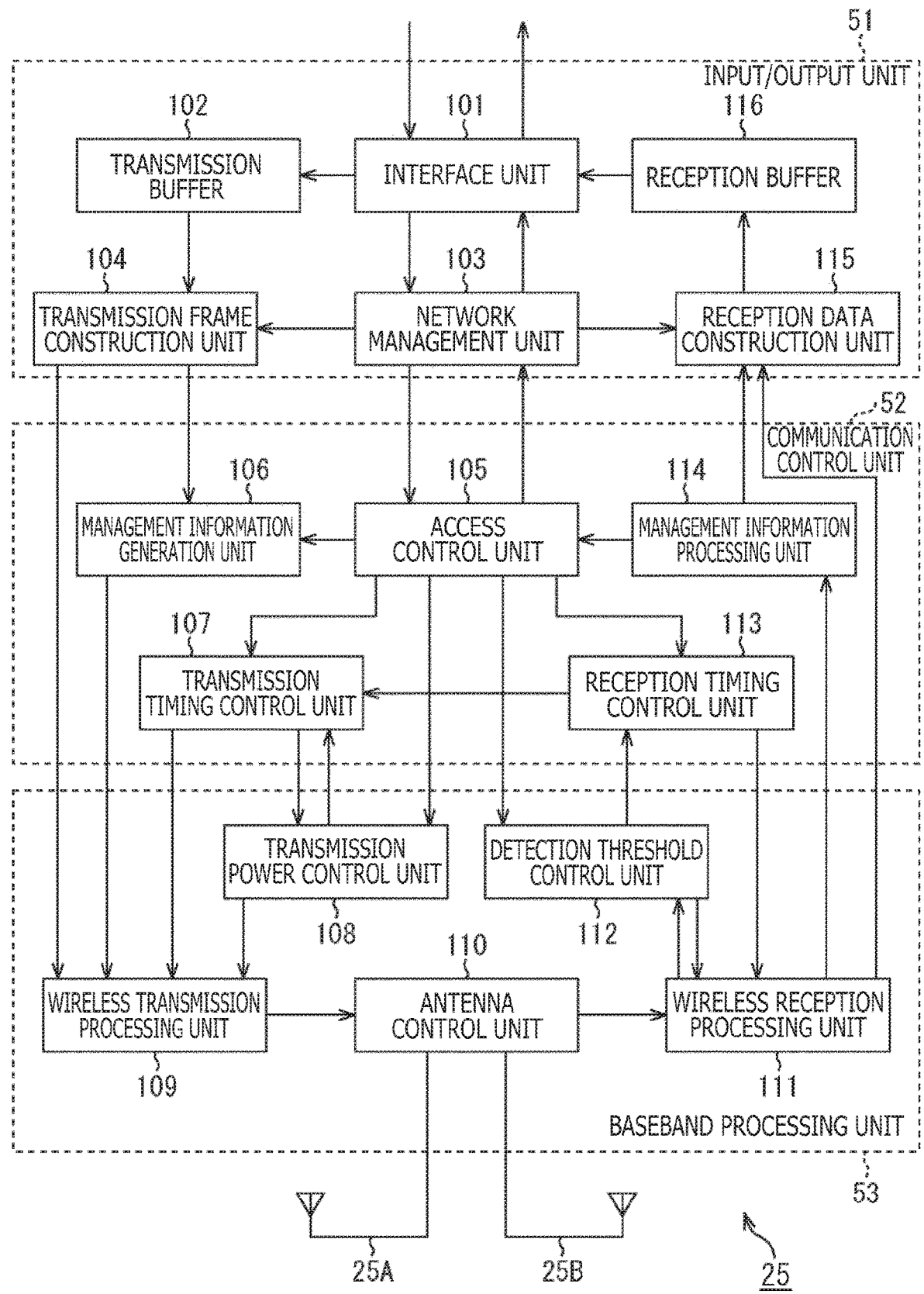
FIG. 14 is a block diagram depicting a function configuration example of a wireless communication module.

FIG. 14 is a block diagram depicting a functional configuration example of the wireless communication module 25.

As depicted in FIG. 14, the wireless communication module 25 includes an input/output unit 51, a communication control unit 52, and a baseband processing unit 53.

The input/output unit 51 includes an interface unit 101, a transmission buffer 102, a network management unit 103, a transmission frame construction unit 104, a reception data construction unit 115, and a reception buffer 116.

The communication control unit 52 includes an access control unit 105, a management information generation unit 106, a transmission timing control unit 107, a reception timing control unit 113, and a management information processing unit 114.

The baseband processing unit 53 includes a transmission power control unit 108, a wireless transmission processing unit 109, an antenna control unit 110, a wireless reception processing unit 111, and a detection threshold control unit 112.

The interface unit 101 of the input/output unit 51 functions as an interface for exchanging data in a predetermined signal format with the device control unit 23 in FIG. 13. For example, the interface unit 101 outputs transmission target data supplied from the device control unit 23 to the transmission buffer 102. In addition, the interface unit 101 outputs reception data stored in the reception buffer 116 and received from the other communication apparatus 11 to the device control unit 23.

The transmission buffer 102 temporarily stores transmission target data. The transmission target data stored in the transmission buffer 102 is read by the transmission frame construction unit 104 at predetermined timing.

The network management unit 103 manages information indicating an own function in the network. For example, in a case where the function to be performed is AC, the network management unit 103 manages addresses of the communication apparatuses 11 constituting the network.

Moreover, the network management unit 103 manages functions performed by the other communication apparatuses 11 belonging to the network, such as the communication apparatus 11 operating as AC, and the communication apparatus 11 operating as IG. The network is managed by the network management unit 103 on the basis of information supplied from the interface unit 101 and the access control unit 105.

The network management unit 103 outputs various types of information such as addresses to the respective units, i.e., the transmission frame construction unit 104, the access control unit 105, and the reception data construction unit 115, as necessary.

The transmission frame construction unit 104 generates a data frame used for transmitting data stored in the transmission buffer 102, and outputs the generated data frame to the wireless transmission processing unit 109.

The access control unit 105 of the communication control unit 52 performs various types of control in accordance with the own function managed by the network management unit 103. For example, in a case of own operation as AC, the access control unit 105 outputs management information, which is information to be stored in a management frame, to the management information generation unit 106.

Moreover, the access control unit 105 performs access control in accordance with a predetermined communication protocol on the basis of information supplied from the network management unit 103 and the management information processing unit 114.

In a case of own operation as AC, the access control unit 105 controls transmission of a null-data packet (NDP (Null Data Packet)), and transmission of a trigger frame. In the network described above where the function of AP is distributed to a plurality of the communication apparatuses 11, data transfer by multiuser MIMO is performed not only between IG and the other communication apparatus 11, but also between AC and the other communication apparatus 11. The trigger frame is used for transfer of parameters for transmission timing control and the like in a case of data transfer by multiuser MIMO.

The access control unit 105 of the communication apparatus 11 operating as IG also controls transmission of a null-data packet, and transmission of a trigger frame.

The management information generation unit 106 generates a management frame containing management information supplied from the access control unit 105, and outputs the generated management frame to the wireless transmission processing unit 109. The management frame generated by the management information generation unit 106 of the communication apparatus 11 operating as AC contains an action frame, a beacon frame, and a trigger frame.

The transmission timing control unit 107 controls frame transmission timing of the wireless transmission processing unit 109. For example, the transmission timing is designated by the access control unit 105.

The transmission power control unit 108 of the baseband processing unit 53 controls radio wave transmission power in accordance with control by the access control unit 105 and the transmission timing control unit 107.

For example, radio wave transmission power of the communication apparatus 11 operating as AC is set within a level sufficient for direct communication with all of the communication apparatuses 11 belonging to the network, including IG. In addition, radio wave transmission power of each of the communication apparatuses 11 performing functions other than AC is set within a level sufficient for direct communication with at least AC.

The wireless transmission processing unit 109 converts the data frame generated by the transmission frame construction unit 104 and the management frame generated by the management information generation unit 106 into a baseband signal. Moreover, the wireless transmission processing unit 109 performs various types of signal processing such as modulation processing for the baseband signal, and supplies the baseband signal subjected to the signal processing to the antenna control unit 110.

The antenna control unit 110 is constituted by connection of a plurality of antennas including antennas 25A and 25B. The antenna control unit 110 transmits, from the antennas 25A and 25B, the signal supplied from the wireless transmission processing unit 109. Moreover, the antenna control unit 110 outputs, to the wireless reception processing unit 111, the signal supplied from the antennas 25A and 25B in response to reception of radio waves transmitted from another apparatus.

The wireless reception processing unit 111 detects a preamble of a frame transmitted in a predetermined format from the signal supplied from the antenna control unit 110, and receives data constituting a header and a data portion and continuing from the preamble. The wireless reception processing unit 111 outputs data contained in a management frame such as a beacon frame and a trigger frame to the management information processing unit 114, and outputs data contained in a data frame transmitted from the other communication apparatus 11 to the reception data construction unit 115.

The detection threshold control unit 112 inputs, to the wireless reception processing unit 111, a setting of a threshold which is a reference for detection of a signal such as a preamble. For example, in a state where radio wave transmission power of the network is controlled, the threshold is set by the detection threshold control unit 112 in accordance with control by the access control unit 105.

The reception timing control unit 113 of the communication control unit 52 controls frame reception timing of the wireless reception processing unit 111. For example, the reception timing is designated by the access control unit 105. Information associated with the frame reception timing is supplied to the transmission timing control unit 107 as necessary.

The management information processing unit 114 analyzes a management frame constituted by data and supplied from the wireless reception processing unit 111. In a case of own designation as a transmission destination of the management frame, the management information processing unit 114 extracts a parameter stored in the management frame to analyze contents of the parameter. The management information processing unit 114 outputs information indicating an analysis result to the access control unit 105 and the reception data construction unit 115. The management information processing unit 114 also analyzes a null data packet as necessary.

The reception data construction unit 115 of the input/output unit 51 removes a header from a data frame constituted by data supplied from the wireless reception processing unit 111 to extract a data portion. The reception data construction unit 115 outputs data contained in the extracted data portion to the reception buffer 116 as reception data. The reception data output to the reception buffer 116 is data addressed to the own address.

The reception buffer 116 temporarily stores the reception data supplied from the reception data construction unit 115. The reception data stored in the reception buffer 116 is read by the interface unit 101 at predetermined timing, and output to the device control unit 23.

The wireless communication module 25 includes the input/output unit 51, the communication control unit 52, and the baseband processing unit 53 each including the above units. In a case where the function of AP is shared by a plurality of the communication apparatuses 11, operations of the respective units are switched depending on the function performed by each of the communication apparatuses 11.

<Operation Example of Overall Network>

Example not Using Spatial Multiplexing

A flow of communication between the communication apparatuses 11 configured as above will be described here with reference to a sequence in FIG. 15.

Figure 15:
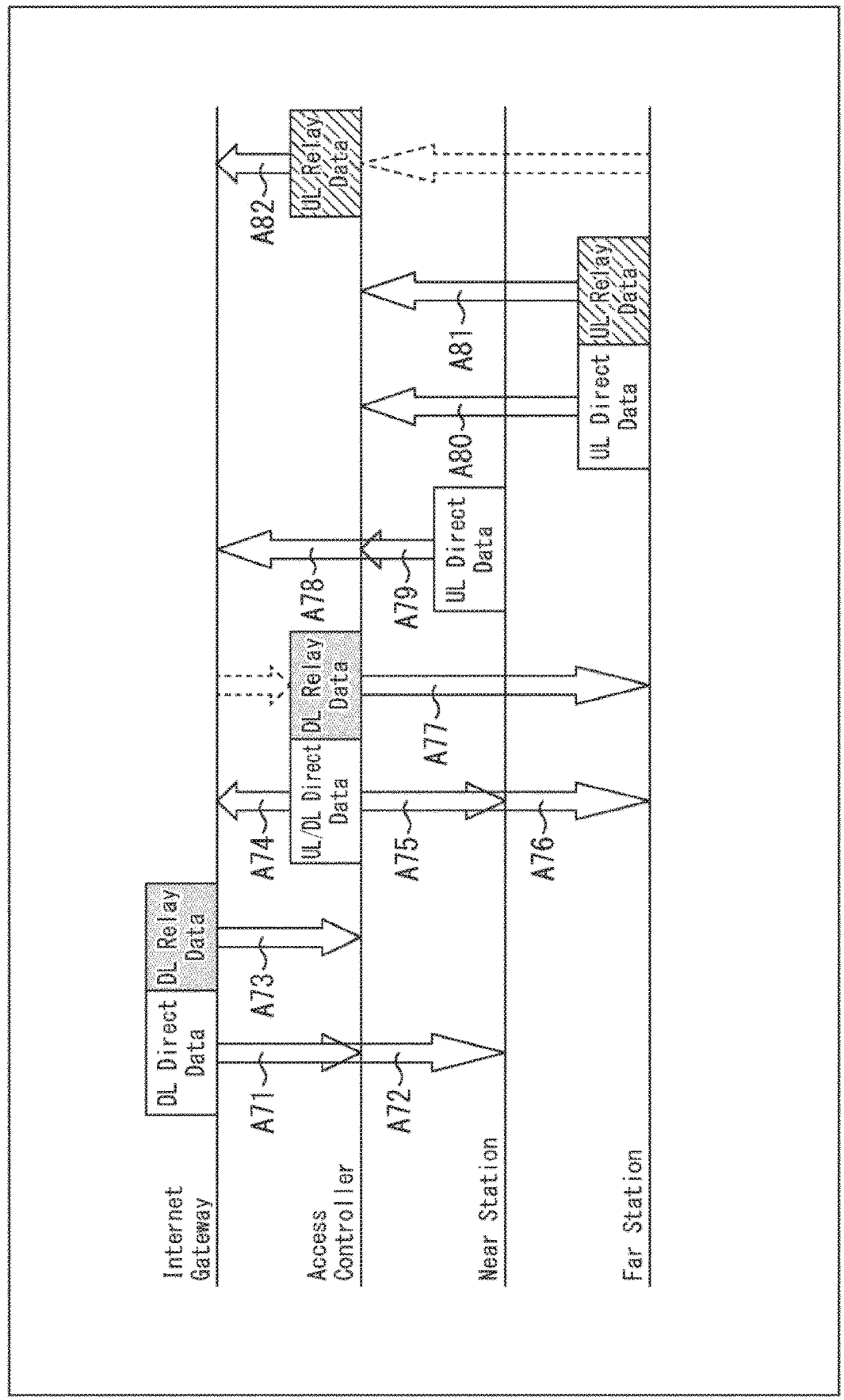
FIG. 15 is a sequence diagram explaining a flow of communication not using spatial multiplexing.

The flow of communication depicted in FIG. 15 is basically similar to the flow of communication described with reference to FIG. 11. It is assumed that settings for operating as IG, AC, Near Station, and Far Station are input to STA 1 to STA 4 as the four communication apparatuses 11, respectively. Operations of IG, AC, Near Station, and Far Station are depicted in this order from the top. Each of Horizontal axes in FIG. 15 represents time.

The respective communication apparatuses 11 in the example of FIG. 15 have the same positional relation as that of FIG. 7. That is, each of the communication apparatuses 11 is capable of directly communicating with the second communication apparatus 11 away, but is uncapable of communicating with the communication apparatus 11 located farther. More specifically, STA 1 operating as IG and STA 4 operating as Far Station are unable to communicate with each other.

It is assumed that an access right (right for transmitting data) is equitably given to all the communication apparatuses in the example of FIG. 15. While one of the communication apparatuses 11 is transmitting data in this configuration, the other communication apparatuses 11 perform control for suspending data transmission.

As depicted in the left end in the uppermost stage, IG transmits data to AC and Near Station as Downlink (DL) Direct Data in a case of data transmission from IG to AC and Near Station as indicated by white arrows A71 and A72.

Concerning data addressed to Far Station, however, IG needs to request AC to function as a relay. In a case of data transmission to Far Station, IG transmits data to AC as Downlink Relay Data as indicated by a white arrow A73.

As depicted in the second stage, AC is capable of communicating with all of the communication apparatuses 11. In a case of data transmission from AC to IG, AC transmits data to IG as Uplink (UL) Direct Data as indicated by a white arrow A74.

In a case of data transmission from AC to Near Station and Far Station, AC transmits data to Near Station and Far Station as Downlink Direct Data as indicated by white arrows A75 and A76.

Moreover, AC relays data transmitted from IG and addressed to Far Station, and transmits the data to Far Station as Downlink Relay Data as indicated by a white arrow A77.

As depicted in the third stage, in a case of data transmission from Near Station to IG and AC, Near Station transmits data to IG and AC as Uplink Direct Data as indicated by white arrows A78 and A79.

As depicted in the fourth stage, in a case of data transmission from Far Station to AC, Far Station transmits data to AC as Uplink Direct Data as indicated by a white arrow A80.

Concerning data addressed to IG, however, Far Station needs to request AC to function as a relay. In a case of data transmission from Far Station to IG, Far Station transmits data to AC as Uplink Relay Data as indicated by a white arrow A81.

AC relays data transmitted from Far Station and addressed to IG, and transmits the data to IG as Uplink Relay Data as indicated by a white arrow A82.

In such a manner, data transmission is achievable such that only one of the communication apparatuses 11 transmits data at certain timing.

Example Using Spatial Multiplexing

Another flow of communication between the communication apparatuses 11 will be described with reference to a sequence in FIG. 16. Description similar to the description given with reference to FIG. 15 will be omitted where appropriate.

Figure 16:
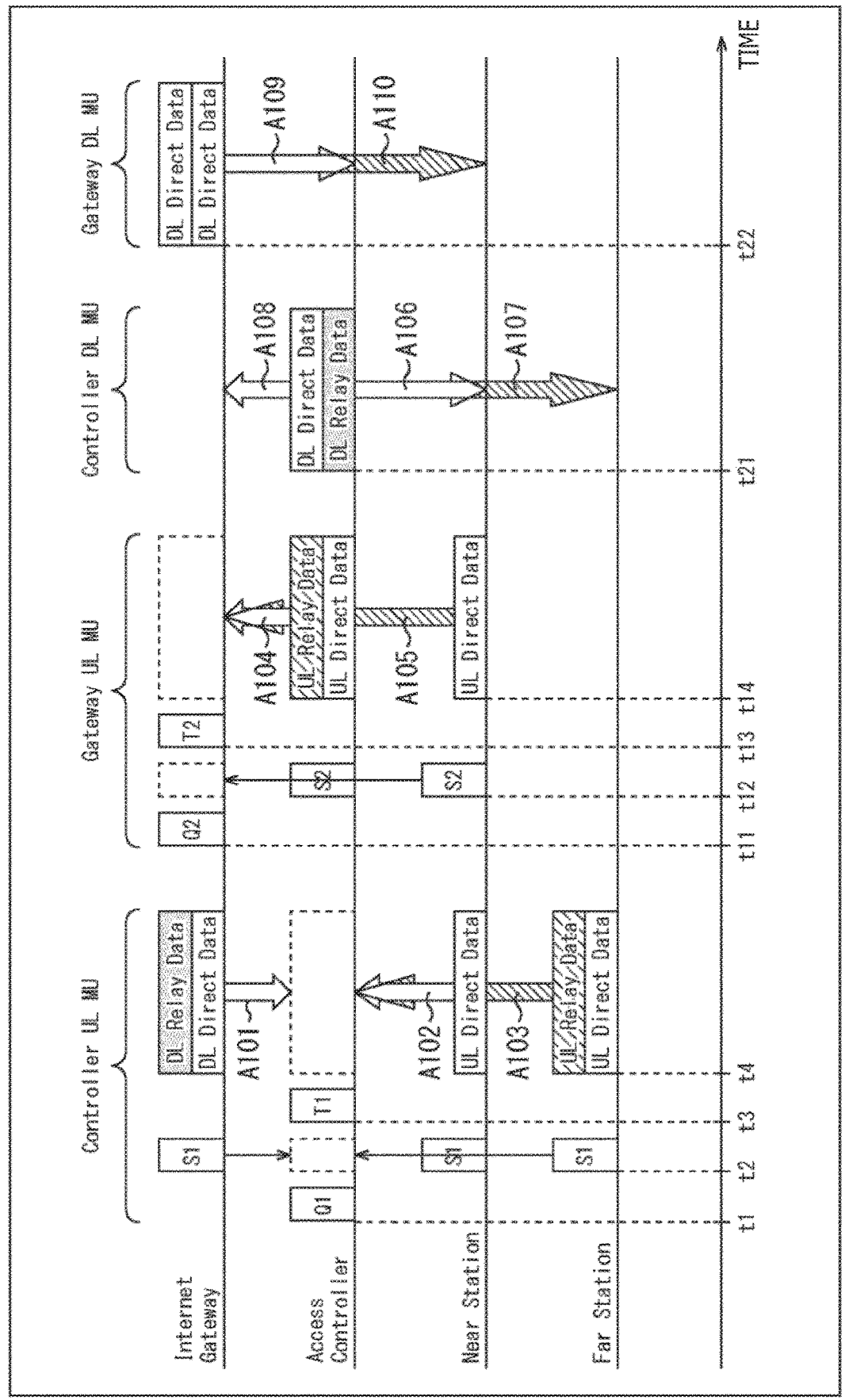
FIG. 16 is a sequence diagram explaining a flow of communication using spatial multiplexing.

FIG. 16 depicts a flow of communication in a case where data transfer is performed using multiuser MIMO. Multiuser MIMO is a method which spatially multiplexes transmission data from a plurality of terminals to simultaneously transfer the data to one terminal, for example.

Data transfer by multiuser MIMO is basically achieved by transmitting a sounding request using a null data packet from a terminal on the reception side, and returning sounding using a null data packet to the terminal on the reception side from a terminal having received the sounding request. A terminal performing data transfer and the like are specified at the terminal on the reception side on the basis of the returned sounding. A trigger frame containing parameters specifying transmission timing and the like is transmitted from the terminal on the reception side to each terminal.

In the network described above where the function of AP is shared by a plurality of the communication apparatuses 11, multiuser MIMO is used for both data transfer to AC and data transfer to IG in the network. In other words, data is transferred to each of the plurality of communication apparatuses 11 designated as a data transmission destination using multiuser MIMO.

Multiuser MIMO used for data transfer to AC as a transmission destination in response to a trigger (cause) given from AC is here referred to as uplink multiuser MIMO (UL MU) to AC. Multiuser MIMO used for data transmission from AC to the other communication apparatus 11 as a transmission destination is referred to as downlink multiuser MIMO (DL MU) from AC.

In addition, multiuser MIMO used for data transfer to IG as a transmission destination in response to a trigger (cause) given from IG is here referred to as uplink multiuser MIMO to IG. Multiuser MIMO used for data transmission from IG to the other communication apparatus 11 as a transmission destination is referred to as downlink multiuser MIMO from IG.

In a case of execution of uplink multiuser MIMO to AC, AC transmits a sounding request (Q1) using a null data packet at a time t1 as indicated at the left end in the second stage.

Each of IG, Near Station, and Far Station having received the sounding request (Q1) from AC returns sounding (S1) using a null data packet in response to the sounding request. At a time t2, AC receives the sounding (S1) returned from each of IG, Near Station, and Far Station.

Note that the sounding (S1) given in response to the sounding request may be returned substantially at the same time using OFDMA (orthogonal frequency-division multiple access) technology, for example, instead of individually fed back to AC. A parameter indicating an amount of data transmitted from each of IG, Near Station, and Far Station is included in the sounding (S1) and transmitted to AC.

At a time t3, AC having received the sounding (S1) sets a transmission parameter corresponding to the amount of data transmitted from each of IG, Near Station, and Far Station, and transmits a trigger frame (T1) containing the transmission parameter. At a time t4, each of IG, Near Station, and Far Station designated by the trigger frame (T1) transmits data by uplink multiuser MIMO to AC in accordance with predetermined procedures.

For example, as indicated by a white arrow A101, IG multiplexes Downlink Direct Data and Downlink Relay Data, and transmits the multiplexed data. In addition, as indicated by a white arrow A102, Near Station transmits Uplink Direct Data. As indicated by a hatched arrow A103, Far Station multiplexes Uplink Direct Data and Uplink Relay Data, and transmits the multiplexed data.

Respective pieces of data to AC are spatially multiplexed and transmitted using multiuser MIMO. AC receives data simultaneously transmitted by multiuser MIMO.

Uplink multiuser MIMO to IG is performed in a similar manner.

More specifically, for performing uplink multiuser MIMO to IG, IG transmits a sounding request (Q2) using a null data packet at a time t11.

Each of AC and Near Station having received the sounding request (Q2) from IG returns sounding (S2) using a null data packet in response to the sounding request. At a time t12, IG receives the sounding (S2) returned from each of AC and Near Station. The sounding request (Q2) from IG does not reach Far Station. Accordingly, sounding is not returned from Far Station.

The sounding (S2) corresponding to the sounding request from IG may be returned using OFDMA similarly to the sounding (S1). A parameter indicating an amount of data to be transmitted from each of AC and Near Station is included in the sounding (S2) and transmitted to IG.

At a time t13, IG having received the sounding (S2) sets a transmission parameter corresponding to the amount of data transmitted from each of AC and Near Station, and transmits a trigger frame (T2) containing the transmission parameter.

At a time t14, each of AC and Near Station designated by the trigger frame (T2) transmits data by uplink multiuser MIMO to IG in accordance with predetermined procedures.

For example, as indicated by a white arrow A104, AC multiplexes Uplink Direct Data and Uplink Relay Data, and transmits the multiplexed data. The Uplink Relay Data transmitted here is data transmitted from Far Station by uplink multiuser MIMO to AC. In addition, as indicated by a hatched white arrow A105, Near Station transmits Uplink Direct Data.

Respective pieces of data to IG are spatially multiplexed and transmitted using multiuser MIMO. IG receives the data simultaneously transmitted by multiuser MIMO.

As described above, in the network where the function of AP is shared by a plurality of the communication apparatuses 11, data is allowed to be transferred by multiuser MIMO in response to triggers from AC and IG.

On the other hand, for performing downlink multiuser MIMO from AC, AC multiplexes Downlink Direct Data to Near Station, and Downlink Direct Data and Downlink Relay Data to Far Station, and transmits the multiplexed data at a time t21 as indicated by a white arrow A106 and an arrow A107. Downlink Relay Data transmitted here is data transmitted from IG by uplink multiuser MIMO to AC. Note that Uplink Direct Data and Uplink Relay Data to IG may be multiplexed and transmitted as foregoing downlink multiuser MIMO from AC described above as necessary as indicated by an arrow A108.

Timing of downlink multiuser MIMO from AC is an occasion that AC acquires a predetermined access right, or is designated by a parameter contained in the trigger frame (T1), for example. Note that the parameter used for downlink data transfer may be a parameter having been exchangeable at the time of uplink data transfer.

Near Station receives Downlink Direct Data transmitted by downlink multiuser MIMO from AC. Moreover, Far Station receives Downlink Direct Data and Downlink Relay Data transmitted from AC by downlink multiuser MIMO from AC.

For performing downlink multiuser MIMO from IG, IG multiplexes Downlink Direct Data to AC, and Downlink Direct Data to Near Station, and transmits the multiplexed data at a time t22 as indicated by a white arrow A109 and an arrow A110. Timing of downlink multiuser MIMO from IG is an occasion that IG acquires a predetermined access right, or is designated by a parameter contained in the trigger frame (T2), for example.

AC receives Downlink Direct Data transmitted by downlink multiuser MIMO from IG. Near Station receives Downlink Direct Data transmitted by downlink multiuser MIMO from IG.

As described above, in the network where the function of AP is shared by a plurality of the communication apparatuses 11, both AC and IG are allowed to perform, by using multiuser MIMO, downlink data transfer in addition to uplink data transfer.

Efficient use of a transfer path of a wireless LAN is achievable by allowing data transfer using multiuser MIMO in response to triggers from a plurality of the communication apparatuses 11.

For example, in the data transfer described with reference to FIG. 15, transmission timing of Downlink Direct Data and transmission timing of Downlink Relay Data from IG to AC are different from each other. However, these pieces of data are simultaneously transmitted in the example of FIG. 16. In addition, in the data transfer described with reference to FIG. 15, transmission timing of Downlink Direct Data and transmission timing of Downlink Relay Data from AC to Far Station are different from each other. However, these pieces of data are simultaneously transmitted in the example of FIG. 16.

Efficient use of a transfer path is achievable by simultaneous transmission of data relayed by AC and other data.

According to the example of FIG. 16, respective pieces of data are successively transmitted. However, these respective pieces of data may be transmitted on an occasion that the communication apparatus 11 transmitting data acquires an access right to a transfer path. For example, transmission timing may be set for respective pieces of data according to an access category of data under enhanced distribution channel access (EDCA) control.

FIG. 17 is a diagram depicting a configuration example of a trigger frame.

As depicted in FIG. 17, the trigger frame includes Padding and FCS in addition to Frame Control, Duration, RA (Receiver Address), TA (Transmitter Address), Common Info, and User Info 1 to N.

Frame Control is information for specifying a frame type. Duration represents frame duration.

RA represents an address of STA corresponding to a receiver of the trigger frame. TA represents an address of STA corresponding to a transmitter of the trigger frame.

Common Info is information common to respective STAs.

Each of User Info 1 to N is individual user information. A transmission parameter used by each of the communication apparatuses 11 for data transmission, such as a parameter indicating transmission timing, is described as User Info 1 to N.

An address of any of the communication apparatuses 11 as the apparatus triggering data transfer by multiuser MIMO is described in a field of the trigger frame TA having the respective items of information described above.

More specifically, an address of the communication apparatus 11 operating as AC is described in the trigger frame TA transmitted by AC. In addition, an address of the communication apparatus 11 operating as IG is described in the trigger frame TA transmitted by IG.

The communication apparatus 11 having received the trigger frame is capable of specifying, on the basis of the description of TA, which of AC and IG is the function performed by the communication apparatus 11 having transmitted the trigger frame.

FIG. 18 is a diagram depicting a configuration example of an HE NDP (High Efficiency Null Data Packet) Announcement frame.

The HE NDP Announcement frame is a management frame transmitted as a sounding request using a null data packet. A format and the like of the null data packet (NDP) are designated on the basis of information contained in the HE NDP Announcement frame.

As depicted in FIG. 18, the HE NDP Announcement frame includes FCS in addition to Frame Control, Duration, RA, TA, Sounding Dialog Token, and STA Info 1 to N.

Frame Control is information for specifying a frame type. Duration represents frame duration.

RA represents an address of STA corresponding to a receiver of the HE NDP Announcement frame.

TA represents an address of STA corresponding to a transmitter of the HE NDP Announcement frame.

Sounding Dialog Token represents a parameter associated with sounding.

Each of STA Info 1 to N is individual STA information.

An address of any of the communication apparatuses 11 as the apparatus issuing a sounding request is described in a field of TA of the HE NDP Announcement frame containing the respective items of information described above.

More specifically, an address of the communication apparatus 11 operating as AC is described in TA of the HE NDP Announcement frame transmitted by AC. In addition, an address of the communication apparatus 11 operating as IG is described in TA of the HE NDP Announcement frame transmitted by IG.

The communication apparatus 11 having received the HE NDP Announcement frame is capable of specifying, on the basis of the description of TA, which of AC and IG is the function performed by the communication apparatus 11 having transmitted the HE NDP Announcement frame.

<Operations of Respective Communication Apparatuses>

Next described will be an operation of each of the communication apparatuses 11 which perform data transfer using multiuser MIMO.

Operation of AC

Figure 19:
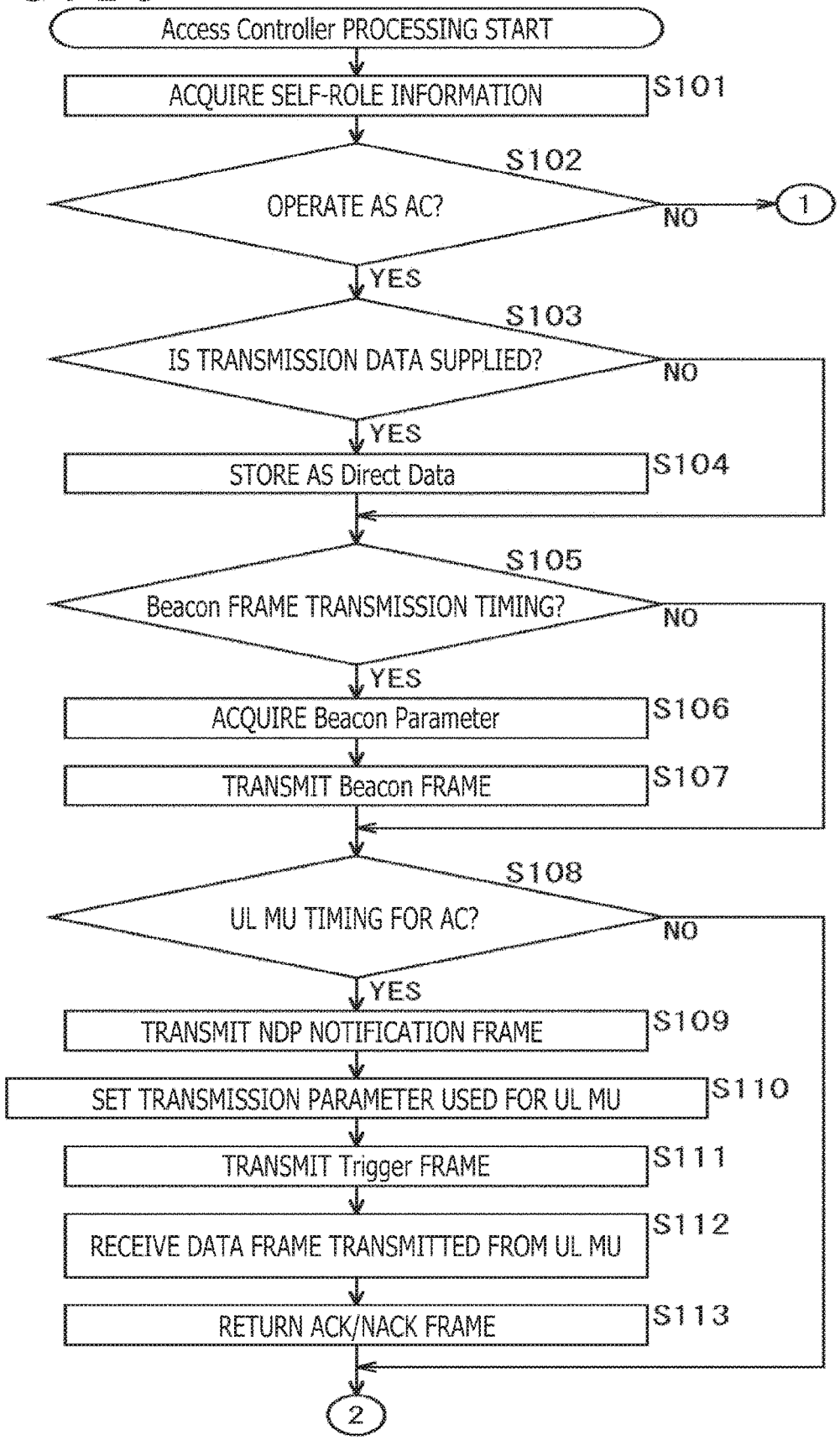
FIG. 19 is a flowchart explaining a process performed by AC.
Figure 20:
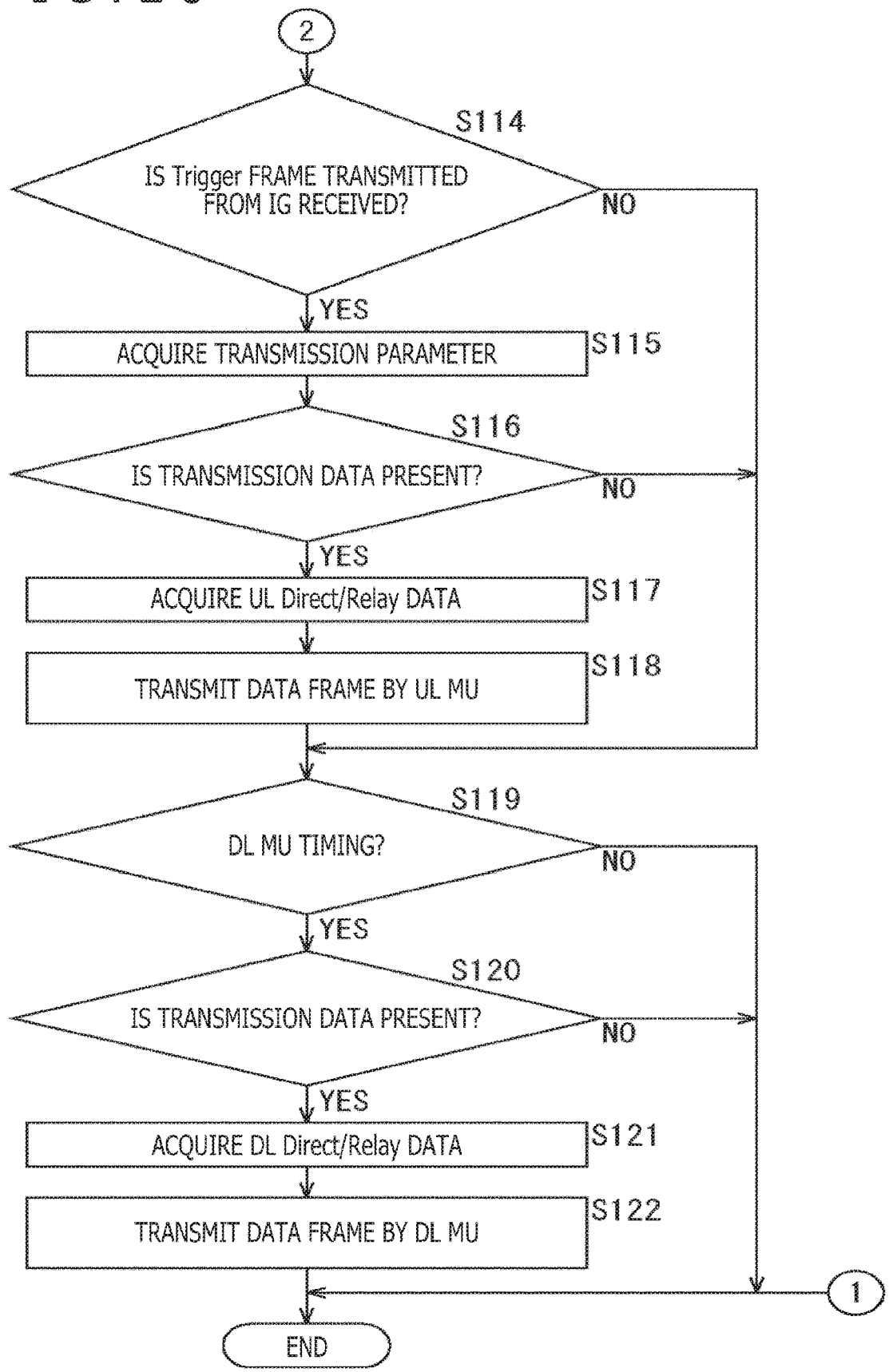
FIG. 20 is a flowchart explaining the process performed by AC and continuing from FIG. 19.

Processing performed by AC will be initially described with reference to a flowchart in FIGS. 19 and 20.

In step S101, the device control unit 23 of AC (FIG. 13) acquires own role information. For example, the role information which is information indicating the own role (function) is set after roles are distributed by the processing described with reference to FIG. 8, and stored in a memory constituting the device control unit 23.

In step S102, the device control unit 23 determines operation or non-operation as AC.

In a case where operation as AC is determined in step S102, the interface unit 101 determines whether or not transmission data has been supplied in step S103. For example, in a case where the device control unit 23 transmits data generated by an executed application to the other communication apparatus 11, transmission data is supplied to the interface unit 101 from the device control unit 23.

In a case of determination that transmission data has been supplied in step S103, the interface unit 101 outputs the transmission data supplied from the device control unit 23 to the transmission buffer 102, and causes the transmission buffer 102 to store the transmission data as Direct Data in step S104. Data transmitted by AC is data directly transmittable to all of the communication apparatuses 11. In a case of determination that transmission data has not been supplied in step S103, processing in step S104 is skipped.

In step S105, the access control unit 105 determines whether or not the current timing is beacon frame transmission timing.

In a case of determination that the current timing is beacon frame transmission timing in step S105, the access control unit 105 acquires a parameter, and causes the management information generation unit 106 to generate a beacon frame containing the acquired parameter in step S106.

In step S107, the wireless transmission processing unit 109 transmits the beacon frame generated by the management information generation unit 106. The beacon frame transmitted here contains Role Separate Information Element (FIG. 10) to which a setting of an own address as Controller Address, and a setting of an address of IG as Gateway Address are input, for example. In a case of determination that the current timing is not beacon frame transmission timing in step S105, processing in steps S106 and S107 is skipped.

In step S108, the access control unit 105 determines whether or not the current timing is timing for performing uplink multiuser MIMO to AC.

In a case of determination that the current timing is timing for performing uplink multiuser MIMO to AC in step S108, the management information generation unit 106 generates an HE NDP Announcement frame (FIG. 18) as an NDP notification frame, for example, and causes the wireless transmission processing unit 109 to transmit the HE NDP Announcement frame in step S109. For example, respective parameters contained in the HE NDP Announcement frame are supplied from the access control unit 105.

The NDP notification frame is transmitted as a sounding request using a null data packet, and sounding using a null data packet is returned from the communication apparatus 11 having received the sounding request. The returned sounding is analyzed by the management information processing unit 114. As a result, a transmission parameter contained in a trigger frame is specified, for example.

In step S110, the management information generation unit 106 sets a transmission parameter of uplink multiuser MIMO and the like specified by the management information processing unit 114 to generate a trigger frame.

In step S111, the wireless transmission processing unit 109 transmits the trigger frame generated by the management information generation unit 106. Data multiplexed by multiuser MIMO is transmitted in accordance with transmission timing designated by the transmission parameter contained in the trigger frame transmitted here is transmitted from the communication apparatus 11 having received the trigger frame.

In step S112, the wireless reception processing unit 111 receives a data frame transmitted from each of the communication apparatuses 11 by uplink multiuser MIMO to AC. This processing corresponds to the processing performed by AC at the time t4 in FIG. 16. The data frame received by the wireless reception processing unit 111 is supplied to the reception data construction unit 115, and analyzed.

For example, Uplink Direct Data transmitted from Near Station and Uplink Direct Data transmitted from Far Station are temporarily stored in the reception buffer 116, and then output from the interface unit 101 to the device control unit 23 as reception data. In addition, Uplink Relay Data transmitted from Far Station and addressed to IG is temporarily stored in the reception buffer 116, and then output to the transmission buffer 102 via the interface unit 101 and stored as data to be transmitted by uplink multiuser MIMO to IG.

In step S113, the management information generation unit 106 transmits an ACK frame to the communication apparatus 11 as a transmitter of a received frame as necessary, and transmits an NACK frame to the communication apparatus 11 as a transmitter of a frame not received.

In a case of determination that the current timing is not timing for performing uplink multiuser MIMO to AC in step S108, the processing from steps S109 to S113 is skipped.

In step S114, the access control unit 105 determines whether or not the trigger frame transmitted from IG has been received. In a case where the trigger frame transmitted from IG has been received, the trigger frame is analyzed at the management information processing unit 114. Thereafter, information associated with the transmission parameter is supplied to the access control unit 105. Note that a process for receiving the NDP notification frame and returning a non-data frame may be performed prior to reception of the trigger frame.

In a case of determination that the trigger frame transmitted from IG has been received in step S114, the access control unit 105 acquires a transmission parameter used for uplink multiuser MIMO to IG on the basis of an analysis result obtained by the management information processing unit 114 in step S115.

In step S116, the access control unit 105 determines whether or not data to be transmitted to IG is present. Uplink Direct Data from AC itself to IG, and Uplink Relay Data transmitted from Far Station and addressed to IG are stored in the transmission buffer 102 as data to be transmitted to IG.

In a case of determination that data to be transmitted to IG is present in S116, the transmission frame construction unit 104 reads and acquires the data to be transmitted to IG from the transmission buffer 102 in step S117.

In step S118, the wireless transmission processing unit 109 multiplexes Uplink Direct Data and Uplink Relay Data, and transmits the multiplexed data by uplink multiuser MIMO to IG. This processing corresponds to the processing performed by AC at the time t14 in FIG. 16.

Timing of uplink multiuser MIMO to IG is controlled by the transmission timing control unit 107 on the basis of the transmission parameter acquired by the access control unit 105, for example.

In a case of determination that the trigger frame transmitted from IG has not been received in step S114, the processing from steps S115 to S118 is skipped. Moreover, in a case of determination that transmission data is absent in step S116, processing in steps S117 and S118 is skipped.

In step S119, the access control unit 105 determines whether or not the current timing is timing for performing downlink multiuser MIMO from AC.

In a case of determination that the current timing is timing for performing downlink multiuser MIMO from AC in step S119, the access control unit 105 determines whether or not data to be transmitted is present in step S120. Downlink Direct Data from AC itself to Near Station, and Downlink Relay Data transmitted from IG and addressed to Far Station are stored in the transmission buffer 102 as data to be transmitted.

In a case of determination that data to be transmitted is present in S120, the transmission frame construction unit 104 reads and acquires the data to be transmitted from the transmission buffer 102 in step S121.

In step S122, the wireless transmission processing unit 109 multiplexes Downlink Direct Data and Downlink Relay Data, and transmits the multiplexed data by downlink multiuser MIMO from AC. This processing corresponds to the processing performed by AC at the time t21 in FIG. 16.

In a case of determination that the current timing is not timing for performing downlink multiuser MIMO from AC in step S119, or in a case where data to be transmitted is absent in step S120, the process ends. In addition, in a case of determination of non-operation as AC in step S102, the process similarly ends.

As described above, the wireless communication module 25 of AC functions as a communication control unit which transmits a trigger frame of uplink multiuser MIMO to AC, and receives data multiplexed and transmitted from a plurality of the communication apparatuses 11 each having received the trigger frame.

In addition, the wireless communication module 25 of AC functions as a communication control unit which receives a trigger frame transmitted from IG as a frame of uplink multiuser MIMO to IG, and transmits, to IG, data multiplexed in accordance with a transmission parameter contained in the trigger frame.

Operation of IG

Figure 21:
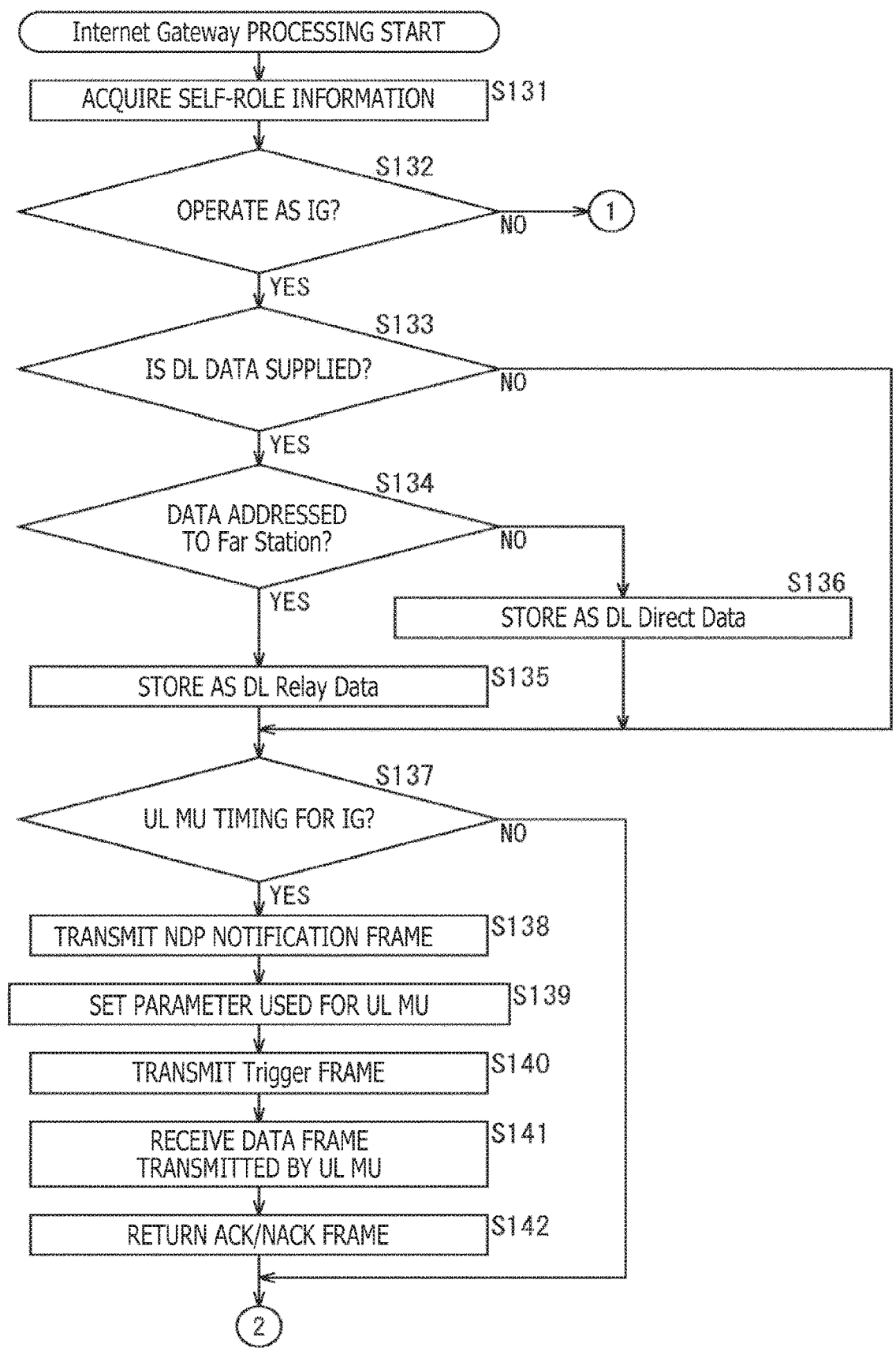
FIG. 21 is a flowchart explaining a process performed by IG.
Figure 22:
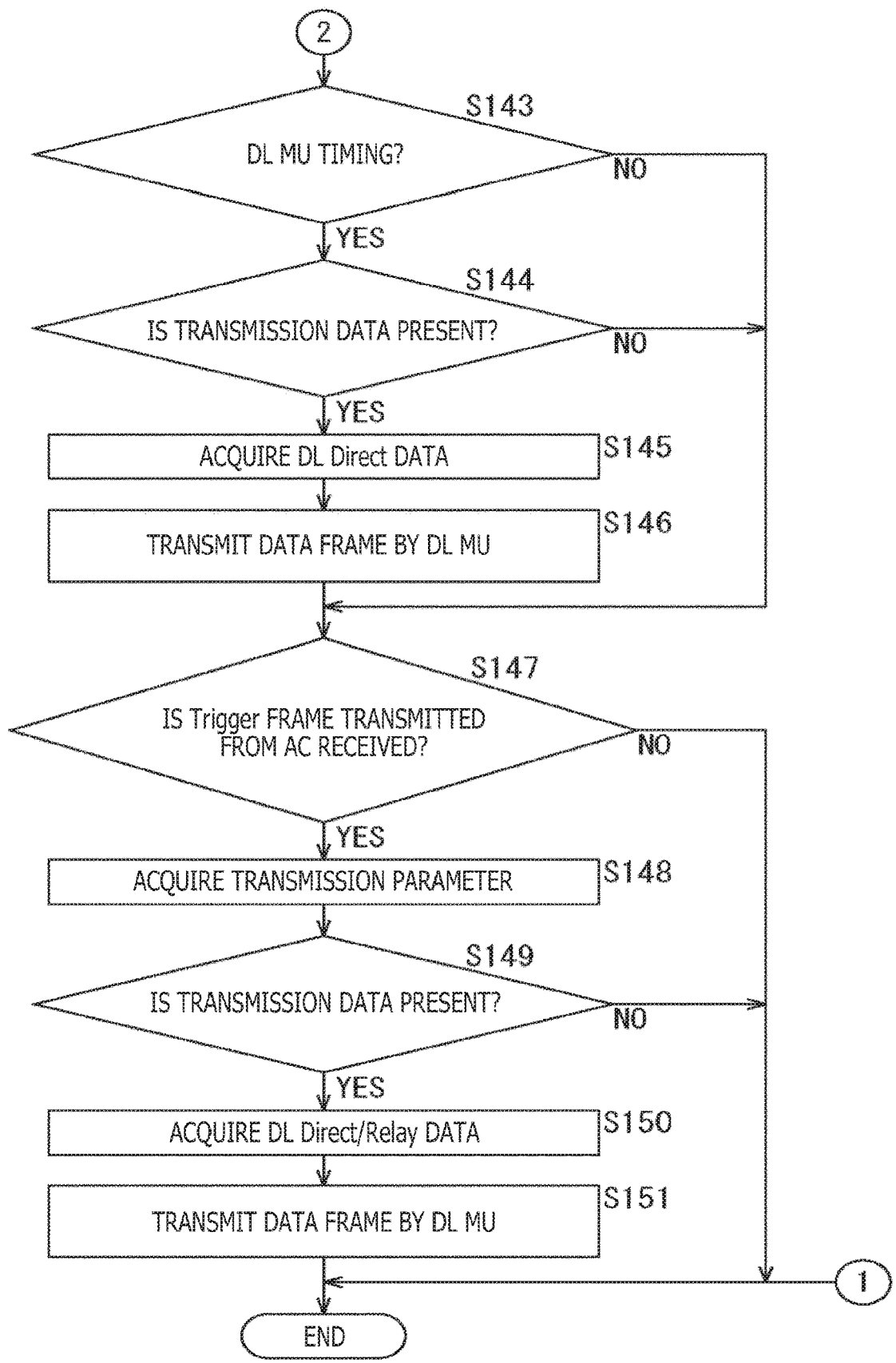
FIG. 22 is a flowchart explaining the process performed by IG and continuing from FIG. 21.

Processing performed by IG will be subsequently described with reference to a flowchart in FIGS. 21 and 22. Description similar to the above description will be omitted where appropriate.

In step S131, the device control unit 23 of IG acquires own role information.

In step S132, the device control unit 23 determines operation or non-operation as IG.

In a case where operation as IG is determined in step S132, the interface unit 101 determines whether or not downlink data has been supplied in step S133.

For example, in a case where data transmitted from an external apparatus and addressed to Near Station is received by the Internet connection module 21, the data addressed to Near Station is supplied from the device control unit 23 as downlink data. In addition, in a case where data transmitted from an external apparatus and addressed to Far Station is received by the Internet connection module 21, the data addressed to Far Station is supplied from the device control unit 23 as downlink data.

In a case of determination that downlink data has been supplied in step S133, the interface unit 101 determines whether or not the downlink data is data addressed to Far Station in step S134.

In a case of determination that the downlink data is data addressed to Far Station in step S134, the interface unit 101 outputs the data supplied from the device control unit 23 to the transmission buffer 102, and causes the transmission buffer 102 to store the data as Downlink Relay Data in step S135.

On the other hand, in a case of determination that the downlink data is not data addressed to Far Station but data addressed to Near Station in step S134, the interface unit 101 outputs the data supplied from the device control unit 23 to the transmission buffer 102, and causes the transmission buffer 102 to store the data as Downlink Direct Data in step S136.

After the data is stored in step S135 or step S136, or in a case of determination that downlink data has not been supplied in step S133, the process proceeds to step S137.

In step S137, the access control unit 105 determines whether or not the current timing is timing for performing uplink multiuser MIMO to IG.

In a case of determination that the current timing is timing for performing uplink multiuser MIMO to IG in step S137, the management information generation unit 106 generates an NDP notification frame, and causes the wireless transmission processing unit 109 to transmit the NDP notification frame in step S138.

The NDP notification frame is transmitted as a sounding request using a null data packet, and sounding using a null data packet is returned from the communication apparatus 11 having received the sounding request. The returned sounding is analyzed by the management information processing unit 114. As a result, a transmission parameter contained in a trigger frame is specified, for example.

In step S139, the management information generation unit 106 sets a transmission parameter and the like of uplink multiuser MIMO specified by the management information processing unit 114 to generate a trigger frame.

In step S140, the wireless transmission processing unit 109 transmits the trigger frame generated by the management information generation unit 106. Data multiplexed by multiuser MIMO is transmitted in accordance with transmission timing designated by the transmission parameter contained in the trigger frame transmitted here is transmitted from the communication apparatus 11 having received the trigger frame.

In step S141, the wireless reception processing unit 111 receives a data frame transmitted from each of the communication apparatuses 11 by uplink multiuser MIMO to IG. This processing corresponds to the processing performed by IG at the time t14 in FIG. 16. The data frame received by the wireless reception processing unit 111 is supplied to the reception data construction unit 115, and analyzed.

For example, Uplink Direct Data and Uplink Relay Data transmitted from AC are temporarily stored in the reception buffer 116, and then output from the interface unit 101 to the device control unit 23 as reception data.

In addition, Uplink Direct Data transmitted from Near Station is temporarily stored in the reception buffer 116 in a similar manner, and then output from the interface unit 101 to the device control unit 23 as reception data.

In step S142, the management information generation unit 106 transmits an ACK frame to the communication apparatus 11 as a transmitter of a received frame as necessary, and transmits an NACK frame to the communication apparatus 11 as a transmitter of a frame not received.

In a case of determination that the current timing is not timing for performing uplink multiuser MIMO to IG in step S137, the processing from steps S138 to S142 is skipped.

In step S143, the access control unit 105 determines whether or not the current timing is timing for performing downlink multiuser MIMO from IG.

In a case of determination that the current timing is timing for performing downlink multiuser MIMO from IG in step S143, the access control unit 105 determines whether or not data to be transmitted is present in step S144. Downlink Direct Data from IG itself to AC or Near Station is stored in the transmission buffer 102 as data to be transmitted.

In a case of determination that data to be transmitted is present in S144, the transmission frame construction unit 104 reads and acquires the data to be transmitted from the transmission buffer 102 in step S145.

In step S146, the wireless transmission processing unit 109 multiplexes Downlink Direct Data, and transmits the multiplexed data by downlink multiuser MIMO from IG. This processing corresponds to the processing performed by IG at the time t22 in FIG. 16.

Note that Downlink Relay Data to Far Station may be transmitted by downlink multiuser MIMO from IG. In this case, Downlink Direct Data to AC or Near Station, and Downlink Relay Data to Far Station are multiplexed, and transmitted by downlink multiuser MIMO from IG.

In step S147, the access control unit 105 determines whether or not the trigger frame transmitted from AC has been received. In a case of determination that the trigger frame transmitted from AC has been received, the trigger frame is analyzed at the management information processing unit 114, and information associated with the transmission parameter is supplied to the access control unit 105. Note that a process for receiving an NDP notification frame and returning a non-data frame may be performed prior to reception of the trigger frame.

In a case of determination that the trigger frame transmitted from AC has been received in step S147, the access control unit 105 acquires a transmission parameter used for uplink multiuser MIMO to AC on the basis of an analysis result obtained by the management information processing unit 114 in step S148.

In step S149, the access control unit 105 determines whether or not data to be transmitted to AC is present. Downlink Direct Data from IG itself to AC, and Downlink Relay Data transmitted from IG itself and addressed to Far Station are stored in the transmission buffer 102 as data to be transmitted to AC.

In a case of determination that data to be transmitted to IG is present in S149, the transmission frame construction unit 104 reads and acquires the data to be transmitted to AC from the transmission buffer 102 in step S150.

In step S151, the wireless transmission processing unit 109 multiplexes Downlink Direct Data and Downlink Relay Data, and transmits the multiplexed data by uplink multiuser MIMO to AC. This processing corresponds to the processing performed by IG at the time t4 in FIG. 16.

Timing of uplink multiuser MIMO to AC is controlled by the transmission timing control unit 107 on the basis of the transmission parameter acquired by the access control unit 105, for example.

In a case of determination that the trigger frame transmitted from AC has not been received in step S147, the processing from steps S148 to S151 is skipped. Thereafter, the process ends. Moreover, in a case of determination that transmission data is absent in step S149, processing in steps S150 and S151 is skipped. Thereafter, the process ends. In a case of determination of non-operation as IG in step S132, the process similarly ends.

As described above, the wireless communication module 25 of IG functions as a communication control unit which transmits a trigger frame of uplink multiuser MIMO to IG, and receives data multiplexed and transmitted from a plurality of the communication apparatuses 11 each having received the trigger frame.

In addition, the wireless communication module 25 of IG functions as a communication control unit which receives a trigger frame transmitted from AC as a frame of uplink multiuser MIMO to AC, and transmits, to AC, data multiplexed in accordance with a transmission parameter contained in the trigger frame.

Operation of Near Station

Figure 23:
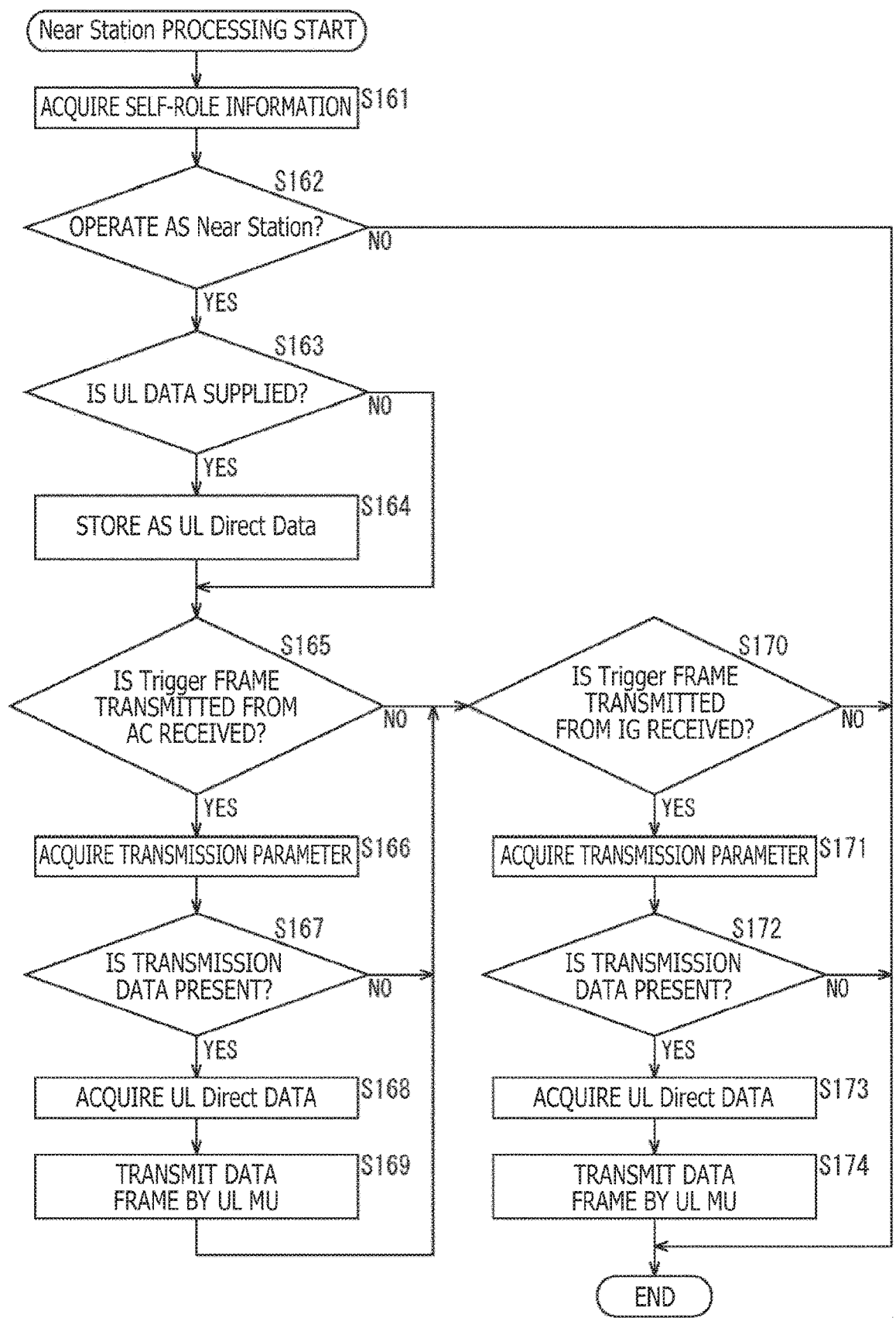
FIG. 23 is a flowchart explaining a process performed by Near Station.

Processing performed by Near Station will be subsequently described with reference to a flowchart in FIG. 23. Description similar to the above description will be omitted where appropriate.

In step S161, the device control unit 23 of Near Station acquires own role information.

In step S162, the device control unit 23 determines operation or non-operation as Near Station.

In a case of determination of operation as Near Station in step S162, the interface unit 101 determines whether or not uplink data has been supplied in step S163. For example, in a case where the device control unit 23 transmits data generated by an executed application to another apparatus, data to be transmitted is supplied from the device control unit 23 as uplink data.

In a case of determination that the uplink data has been supplied in step S163, the interface unit 101 outputs the data supplied from the device control unit 23 to the transmission buffer 102, and causes the transmission buffer 102 to store the data as Uplink Direct Data in step S164. In a case of determination that the uplink data has not been supplied in step S163, processing in step S164 is skipped.

In step S165, the access control unit 105 determines whether or not a trigger frame transmitted from AC has been received. In a case where the trigger frame transmitted from AC has been received, the trigger frame is analyzed at the management information processing unit 114, and information associated with a transmission parameter is supplied to the access control unit 105. Note that a process for receiving an NDP notification frame and returning a non-data frame may be performed prior to reception of the trigger frame.

In a case of determination that the trigger frame transmitted from AC has been received in step S165, the access control unit 105 acquires a transmission parameter used for uplink multiuser MIMO to AC on the basis of an analysis result obtained by the management information processing unit 114 in step S166.

In step S167, the access control unit 105 determines whether or not data to be transmitted to AC is present. Uplink Direct Data addressed from Near Station itself to AC is stored in the transmission buffer 102 as data to be transmitted to AC.

In a case of determination that data to be transmitted to AC is present in S167, the transmission frame construction unit 104 reads and acquires the data to be transmitted to AC from the transmission buffer 102 in step S168.

In step S169, the wireless transmission processing unit 109 transmits Uplink Direct Data by uplink multiuser MIMO to AC. This processing corresponds to the processing performed by Near Station at the time t4 in FIG. 16.

Timing of uplink multiuser MIMO to AC is controlled by the transmission timing control unit 107 on the basis of the transmission parameter acquired by the access control unit 105, for example.

In a case of determination that the trigger frame transmitted from AC has not been received in step S165, or in a case of determination that data to be transmitted to AC is absent in step S167, the process proceeds to step S170. In a case where data transfer is performed in step S169, the process similarly proceeds to step S170.

In step S170, the access control unit 105 determines whether or not the trigger frame transmitted from IG has been received. In a case where the trigger frame transmitted from IG has been received, the trigger frame is analyzed at the management information processing unit 114, and information associated with the transmission parameter is supplied to the access control unit 105. Note that a process for receiving an NDP notification frame and returning a non-data frame may be performed prior to reception of the trigger frame.

In a case of determination that the trigger frame transmitted from IG has been received in step S170, the access control unit 105 acquires a transmission parameter used for uplink multiuser MIMO to IG on the basis of an analysis result obtained by the management information processing unit 114 in step S171.

In step S172, the access control unit 105 determines whether or not data to be transmitted to IG is present. Uplink Direct Data addressed from Near Station itself to IG is stored in the transmission buffer 102 as data to be transmitted to IG.

In a case of determination that data to be transmitted to IG is present in S172, the transmission frame construction unit 104 reads and acquires the data to be transmitted to IG from the transmission buffer 102 in step S173.

In step S174, the wireless transmission processing unit 109 transmits Uplink Direct Data by uplink multiuser MIMO to IG. This processing corresponds to the processing performed by Near Station at the time t14 in FIG. 16.

Timing of uplink multiuser MIMO to IG is controlled by the transmission timing control unit 107 on the basis of the transmission parameter acquired by the access control unit 105, for example.

In a case of determination that the trigger frame transmitted from IG has not been received in step S170, or in a case of determination that data to be transmitted to IG is absent in step S172, the process ends. In a case of determination of non-operation as Near Station in step S162, the process similarly ends.

As described above, the wireless communication module 25 of Near Station functions as a communication control unit which receives a trigger frame transmitted from AC as a frame of uplink multiuser MIMO to AC, and transmits data to AC in accordance with a transmission parameter contained in the trigger frame.

In addition, the wireless communication module 25 of Near Station functions as a communication control unit which receives a trigger frame transmitted from IG as a frame of uplink multiuser MIMO to IG, and transmits data to IG in accordance with a transmission parameter contained in the trigger frame.

Operation of Far Station

Figure 24:
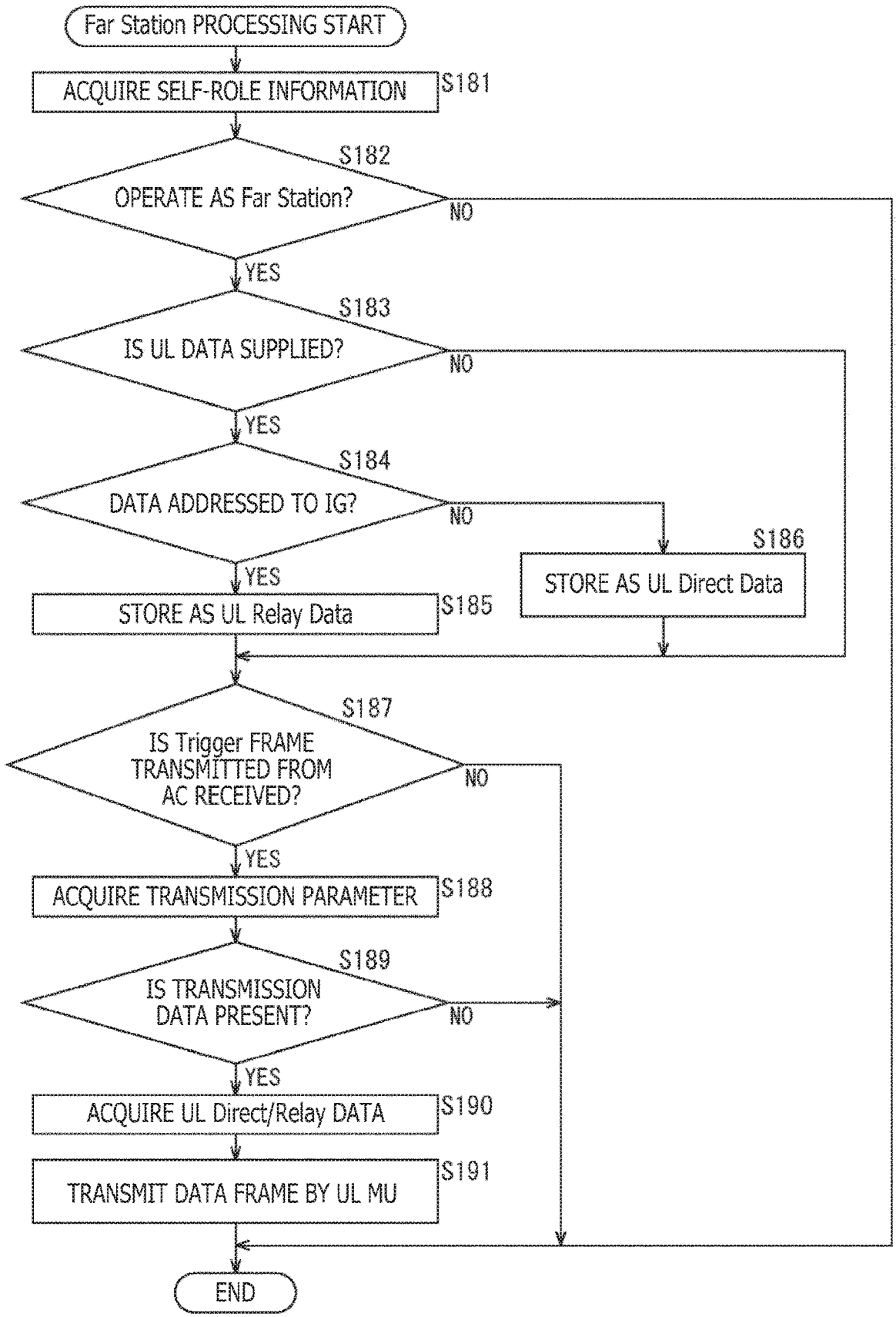
FIG. 24 is a flowchart explaining a process performed by Far Station.

Processing performed by Far Station will be subsequently described with reference to a flowchart in FIG. 24. Description similar to the above description will be omitted where appropriate.

In step S181, the device control unit 23 of Far Station acquires own role information.

In step S182, the device control unit 23 determines operation or non-operation as Far Station.

In a case where operation as Far Station is determined in step S182, the interface unit 101 determines whether or not uplink data has been supplied in step S183. For example, in a case where the device control unit 23 transmits data generated by an executed application to another apparatus, data to be transmitted is supplied from the device control unit 23 to the interface unit 101 as uplink data.

In a case of determination that uplink data has been supplied in step S183, the interface unit 101 determines whether or not the uplink data is data addressed to IG in step S184.

In a case of determination that the uplink data is data addressed to IG in step S184, the interface unit 101 outputs data supplied from the device control unit 23 to the transmission buffer 102, and causes the transmission buffer 102 to store the data as Uplink Relay Data in step S185.

On the other hand, in a case of determination that the uplink data is data addressed not to IG but to AC in step S184, the interface unit 101 outputs data supplied from the device control unit 23 to the transmission buffer 102, and causes the transmission buffer 102 to store the data as Uplink Direct Data in step S186.

After the data is stored in step S185 or step S186, or in a case of determination that uplink data has not been supplied in step S183, the process proceeds to step S187.

In step S187, the access control unit 105 determines whether or not the trigger frame transmitted from AC has been received. In a case where the trigger frame transmitted from AC has been received, the trigger frame is analyzed at the management information processing unit 114, and information associated with a transmission parameter is supplied to the access control unit 105. Note that a process for receiving an NDP notification frame and returning a non-data frame may be performed prior to reception of the trigger frame.

In a case of determination that the trigger frame transmitted from AC has been received in step S187, the access control unit 105 acquires a transmission parameter used for uplink multiuser MIMO to AC on the basis of an analysis result obtained by the management information processing unit 114 in step S188.

In step S189, the access control unit 105 determines whether or not data to be transmitted to AC is present. Uplink Direct Data addressed from Far Station itself to AC, and Uplink Relay Data addressed from Far Station itself to IG are stored in the transmission buffer 102 as data to be transmitted to AC.

In a case of determination that data to be transmitted to AC is present in S189, the transmission frame construction unit 104 reads and acquires the data to be transmitted to AC from the transmission buffer 102 in step S190.

In step S191, the wireless transmission processing unit 109 multiplexes Uplink Direct Data and Uplink Relay Data, and transmits the multiplexed data by uplink multiuser MIMO to AC. This processing corresponds to the processing performed by Far Station at the time t4 in FIG. 16.

Timing of uplink multiuser MIMO to AC is controlled by the transmission timing control unit 107 on the basis of the transmission parameter acquired by the access control unit 105, for example.

In a case of determination that the trigger frame transmitted from AC has not been received in step S187, or in a case of determination that data to be transmitted to AC is absent in step S189, the process ends. In a case of determination of non-operation as Near Station in step S182, the process similarly ends.

As described above, the wireless communication module 25 of Far Station functions as a communication control unit which receives a trigger frame transmitted from AC as a frame of uplink multiuser MIMO to AC, and transmits multiplexed data to AC in accordance with a transmission parameter contained in the trigger frame.

As described above, efficient use of a transfer path in a wireless LAN is achievable by allowing data transfer using multiuser MIMO in response to triggers from a plurality of the communication apparatuses.

In addition, the current mechanism of multiuser MIMO is applicable to data transfer performed by another communication apparatus by allowing data transfer using multiuser MIMO without limitation to a particular communication apparatus for triggering the data transfer.

A communication apparatus present around AC or IG is capable of efficiently transmitting data by receiving a trigger frame transmitted from AC or IG, and performing data transfer by multiuser MIMO.

By giving IG a function of transmitting a trigger frame which triggers data transfer by multiuser MIMO, achievable is such control which allows another apparatus to perform data transfer by multiuser MIMO only in a case of high transmission efficient.

By giving the function of AC to the communication apparatus 11 located near the center of the range desired by the user, and optimizing radio wave transmission power in the overall network, the network for performing data transfer by multiuser MIMO can be defined only in a minimum necessary range.

<Modifications>

Described above has been the case where the function of AC, the function of IG, and the function of IC are distributed. However, the function of AP may be further divided, and each of the divided functions may be distributed to a larger number of the communication apparatuses 11.

In the network where the function of AP is shared by a plurality of the communication apparatuses 11 as described above, data transfer by OFDMA may be performed instead of data transfer by multiuser MIMO.

Configuration Example of Computer

A series of processes described above may be executed by hardware or may be executed by software. In a case where the series of processes are executed by software, a program constituting the software is installed from a program recording medium into a computer incorporated in dedicated hardware, a general-purpose personal computer, or the like.

FIG. 25 is a block diagram depicting a configuration example of hardware of a computer which executes the series of processes described above under the program.

A CPU (Central Processing Unit) 1001, a ROM (Read Only Memory) 1002, and a RAM (Random Access Memory) 1003 are connected to each other via a bus 1004.

An input/output interface 1005 is further connected to the bus 1004. An input unit 1006 including a keyboard, a mouse, and the like, and an output unit 1007 including a display, a speaker, and the like are connected to the input/output interface 1005. In addition, a storage unit 1008 including a hard disk, a non-volatile memory, and the like, a communication unit 1009 including a network interface and the like, and a drive 1010 driving a removable medium 1011 are connected to the input/output interface 1005.

According to the computer configured as above, the CPU 1001 loads a program stored in the storage unit 1008 into the RAM 1003 via the input/output interface 1005 and the bus 1004, and executes the loaded program to perform the series of processes described above, for example.

The program executed by the CPU 1001 is recorded in the removable medium 1011, or provided via a wired or wireless transfer medium such as a local area network, the Internet, and digital broadcasting, and installed into the storage unit 1008, for example.

Note that the program executed by the computer may be a program where the processes are performed in time series in the order described in the present description, or a program where the processes are performed in parallel or at necessary timing such as an occasion of a call.

In the present description, a system refers to an assembly of a plurality of constituent elements (apparatuses, modules (parts), and the like). It does not matter whether or not all the constituent elements are contained in an identical housing. Accordingly, a plurality of apparatuses stored in different housings and connected to each other via a network, and one apparatus storing a plurality of modules in one housing are each referred to as a system.

Note that advantageous effects described in the present description are presented only by way of example. Advantageous effects to be offered are not limited to these advantageous effects, but may include other advantages effects.

Embodiments according to the present technology are not limited to the embodiment described above. Various modifications may be made without departing from the subject matters of the present technology.

For example, the present technology may be configured as cloud computing where one function is shared by a plurality of apparatuses and processed in cooperation with each other via a network.

Moreover, the respective steps described in the above flowcharts may be executed by one apparatus, or may be shared and executed by a plurality of apparatuses.

Furthermore, in a case where one step contains a plurality of processes, the plurality of processes contained in the one step may be executed by one apparatus, or may be shared and executed by a plurality of apparatuses.

Examples of Configuration Combination

The present technology may have following configurations.

(1)

A communication apparatus including:

a communication control unit that transmits a first trigger frame containing a transmission parameter used for data transmission to a plurality of apparatuses belonging to a wireless LAN, and receives data multiplexed and transmitted from the plurality of apparatuses having received the first trigger frame in accordance with the transmission parameter, and h receives a second trigger frame transmitted from a predetermined apparatus of the plurality of apparatuses, and transmits multiplexed data to the predetermined apparatus in accordance with a transmission parameter contained in the received second trigger frame.

(2)

The communication apparatus according to (1) described above, further including:

a management unit that manages information associated with apparatuses that perform respective functions including a function of access control associated with access to the wireless LAN and including transmission of a beacon frame, and a function of a gateway of the wireless LAN for an external network.

(3)

The communication apparatus according to (2) described above, in which, in a case where performing the function of the access control by the communication apparatus is managed by the management unit, the communication control unit receives data addressed to the communication apparatus, and multiplexed and transmitted from the predetermined apparatus that operates as an apparatus performing the function of the gateway, and data addressed to a remote apparatus located out of a radio wave reach range of the predetermined apparatus.

(4)

The communication apparatus according to (3) described above, in which the communication control unit further receives data addressed to the communication apparatus and transmitted from a near apparatus located within the radio wave reach range of the predetermined apparatus, and data addressed to the communication apparatus and data addressed to the predetermined apparatus both transmitted from the remote apparatus.

(5)

The communication apparatus according to (3) or (4) described above, in which the communication control unit multiplexes and transmits data addressed from the communication apparatus to the predetermined apparatus, and data addressed to the predetermined apparatus and transmitted from the remote apparatus in response to reception of the second trigger frame transmitted from the predetermined apparatus.

(6)

The communication apparatus according to (4) described above, in which the communication control unit multiplexes and transmits data addressed from the communication apparatus to the near apparatus, and data addressed to the remote apparatus and transmitted from the predetermined apparatus.

(7)

The communication apparatus according to any one of (3) to (6) described above, in which the communication control unit controls radio wave transmission power in a communication allowable range with the predetermined apparatus.

(8)

The communication apparatus according to (2) described above, in which, in a case where performing the function of the gateway by the communication apparatus is managed by the management unit, the communication control unit receives data multiplexed and transmitted from the predetermined apparatus that operates as an apparatus performing the function of the access control, the data addressed from the predetermined apparatus to the communication apparatus, and data addressed from a remote apparatus located out of a radio wave reach range of the communication apparatus to the communication apparatus.

(9)

The communication apparatus according to (8) described above, in which the communication control unit further receives data addressed to the communication apparatus and transmitted from a near apparatus located within the radio wave reach range of the communication apparatus.

(10)

The communication apparatus according to (9) described above, in which the communication control unit multiplexes and transmits data addressed from the communication apparatus to the predetermined apparatus, and data transmitted via the predetermined apparatus as a relay and addressed to the remote apparatus in response to reception of the trigger frame transmitted from the predetermined apparatus.

(11)

The communication apparatus according to (9) or (10) described above, in which the communication control unit multiplexes and transmits data addressed from the communication apparatus to the predetermined apparatus, and data addressed from the communication apparatus to the near apparatus.

(12)

The communication apparatus according to any one of (8) to (11) described above, in which the communication control unit controls radio wave transmission power in a communication allowable range with the predetermined apparatus.

(13)

A communication apparatus including:

a communication control unit that receives a trigger frame transmitted from a first apparatus that performs a function of access control associated with access to a wireless LAN and including transmission of a beacon frame, the trigger frame containing a transmission parameter used for data transmission, and, in accordance with the transmission parameter contained in the received trigger frame, multiplexes and transmits data addressed to the first apparatus, and data transmitted via the first apparatus as a relay, and addressed to a second apparatus that performs a function of a gateway of the wireless LAN for an external network.

(14)

The communication apparatus according to (13) described above, in which the communication control unit receives data addressed from the first apparatus to the communication apparatus, and multiplexed and transmitted from the first apparatus, and data addressed from the second apparatus to the communication apparatus.

(15)

A communication system including:

a first communication apparatus that includes a management unit that manages information indicating that a function of access control associated with access to a wireless LAN and including transmission of a beacon frame is performed, and a communication control unit that transmits a first trigger frame containing a transmission parameter used for data transmission to a plurality of apparatuses belonging to the wireless LAN, and receives data multiplexed and transmitted from the plurality of apparatuses having received the first trigger frame in accordance with the transmission parameter, and also receives a second trigger frame transmitted from a predetermined apparatus of the plurality of apparatuses, and transmits multiplexed data to the predetermined apparatus in accordance with the transmission parameter contained in the received second trigger frame; and a second communication apparatus that is the predetermined apparatus and includes a management unit that manages information indicating that a function of a gateway of the wireless LAN for an external network is performed, and a communication control unit that transmits the second trigger frame to the plurality of apparatuses, and receives data multiplexed and transmitted from the plurality of apparatuses each having received the second trigger frame in accordance with the transmission parameter, and also receives the first trigger frame transmitted from the first communication apparatus of the plurality of apparatuses, and transmits multiplexed data to the first communication apparatus in accordance with the transmission parameter contained in the received first trigger frame.

(16)

A communication apparatus including:

a communication control unit that transmits data to a plurality of apparatuses belonging to a wireless LAN as multiplexed downlink data, and receives multiplexed downlink data transmitted to a plurality of communication apparatuses located around the communication apparatus, and extracts data addressed to the communication apparatus from the received data.

REFERENCE SIGNS LIST

11 Communication apparatus, 21 Internet connection module, 22 Information input module, 23 Device control unit, 24 Information output module, 25 Wireless communication module, 51 Input/output unit, 52 Communication control unit, 53 Baseband processing unit, 101 Interface unit, 102 Transmission buffer, 103 Network management unit, 104 Transmission frame construction unit, 105 Access control unit, 106 Management information generation unit, 107 Transmission timing control unit, 108 Transmission power control unit, 109 Wireless transmission processing unit, 110 Antenna control unit, 111 Wireless reception processing unit, 112 Detection threshold control unit, 113 Reception timing control unit, 114 Management information processing unit, 115 Reception data construction unit, 116 Reception buffer

The invention claimed is:

1. A communication apparatus, comprising:
a communication control unit configured to:
transmit a first trigger frame to a plurality of apparatuses associated with a wireless LAN, wherein the first trigger frame includes a first transmission parameter for data transmission,
receive first multiplexed data from the plurality of apparatuses based on the transmission parameter,
receive a second trigger frame from a specific apparatus of the plurality of apparatuses, and
transmit second multiplexed data to the specific apparatus based on a second transmission parameter contained in the received second trigger frame; and
a management unit configured to manage information associated with the plurality of apparatuses that has functions including:
a function of access control associated with access to the wireless LAN and including transmission of a beacon frame to each of the plurality of apparatuses, wherein
the beacon frame includes role separate information indicating roles performed by each of the plurality of apparatuses belonging to the wireless LAN, and
a function of a gateway of the wireless LAN for an external network.

2. The communication apparatus according to claim 1, wherein
the communication apparatus has the function of the access control,
the management unit is further configured to manage the function of the access control,
the communication control unit is further configured to receive the first multiplexed data from the specific apparatus that has the function of the gateway, and
the first multiplexed data includes:
first data addressed to the communication apparatus, and
second data addressed to a remote apparatus located out of a radio wave reach range of the specific apparatus.

3. The communication apparatus according to claim 2, wherein the communication control unit is further configured to:
receive third data addressed to the communication apparatus and transmitted from a near apparatus located within the radio wave reach range of the specific apparatus, and
receive fourth data addressed to the communication apparatus and fifth data addressed to the specific apparatus, wherein
the fourth data and the fifth data are transmitted from the remote apparatus.

4. The communication apparatus according to claim 2, wherein
the communication control unit is further configured to multiplex and transmit, third data and fourth data as the second multiplexed data, in response to reception of the second trigger frame from the specific apparatus, wherein
the third data is addressed from the communication apparatus to the specific apparatus, and
the fourth data is addressed to the specific apparatus and transmitted from the remote apparatus.

5. The communication apparatus according to claim 3, wherein the communication control unit is further configured to multiplex and transmit:
fifth data addressed from the communication apparatus to the near apparatus, and
sixth data addressed to the remote apparatus and transmitted from the specific apparatus.

6. The communication apparatus according to claim 2, wherein
the communication control unit is further configured to control radio wave transmission power in a communication allowable range with the specific apparatus.

7. The communication apparatus according to claim 1, wherein
the communication apparatus has the function of the gateway,
the management unit is further configured to manage the function of the gateway,
the communication control unit is further configured to receive the first multiplexed from the specific apparatus that has the function of the access control, and
the first multiplexed data includes:
first data addressed from the specific apparatus to the communication apparatus, and second data addressed to the communication apparatus from a remote apparatus located out of a radio wave reach range of the communication apparatus.

8. The communication apparatus according to claim 7, wherein
the communication control unit is further configured to receive third data addressed to the communication apparatus and transmitted from a near apparatus located within the radio wave reach range of the communication apparatus.

9. The communication apparatus according to claim 8, wherein
the communication control unit is further configured to multiplex and transmit, fourth data and fifth data, in response to reception of the second trigger frame from the specific apparatus, wherein
the fourth data is addressed from the communication apparatus to the specific apparatus, and
the fifth data transmitted via the specific apparatus as a relay and addressed to the remote apparatus from the communication apparatus.

10. The communication apparatus according to claim 8, wherein
the communication control unit is further configured to multiplex and transmit:
fourth data addressed from the communication apparatus to the predetermined specific apparatus, and
fifth data addressed from the communication apparatus to the near apparatus.

11. The communication apparatus according to claim 7, wherein
the communication control unit is further configured to control radio wave transmission power in a communication allowable range with the specific apparatus.

12. A communication apparatus, comprising:
a communication control unit configured to:
receive a trigger frame from a first apparatus, wherein
the first apparatus has a function of access control associated with access to a wireless LAN and transmission of a beacon frame to a plurality of apparatuses associated with the wireless LAN,
the beacon frame includes role separate information indicating roles performed by each of the plurality of apparatuses belonging to the wireless LAN, and
the trigger frame includes a transmission parameter used for data transmission, and
multiplex and transmit, first data addressed to the first apparatus and second data addressed to a second apparatus, based on the transmission parameter included in the trigger frame, wherein
the second data is transmitted via the first apparatus as a relay, and
the second apparatus has a function of a gateway of the wireless LAN for an external network.

13. The communication apparatus according to claim 12, wherein the communication control unit is further configured to receive:
third data addressed from the first apparatus to the communication apparatus and multiplexed and transmitted from the first apparatus, and
fourth data addressed from the second apparatus to the communication apparatus.

14. A communication system, comprising:
a first communication apparatus that includes:
a first management unit configured to manage information indicating that the first communication apparatus has a function of access control associated with access to a wireless LAN, wherein the function of the access control includes transmission of a beacon frame, and
a first communication control unit configured to:
transmit a first trigger frame to a plurality of apparatuses belonging to the wireless LAN, wherein the first trigger frame includes a first transmission parameter for data transmission,
receive first multiplexed data from the plurality of apparatuses based on the first transmission parameter,
receive a second trigger frame from a specific apparatus of the plurality of apparatuses, and
transmit second multiplexed data to the specific apparatus based on a second transmission parameter contained in the received second trigger frame; and
a second communication apparatus that is the specific apparatus and includes:
a second management unit configured to manage information indicating that the second communication apparatus has a function of a gateway of the wireless LAN for an external network, and
a second communication control unit configured to:
transmit the second trigger frame to the plurality of apparatuses,
receive third multiplexed data from the plurality of apparatuses based on the second transmission parameter,
receive the first trigger frame transmitted from the first communication apparatus of the plurality of apparatuses, and
transmit fourth multiplexed data to the first communication apparatus based on the first transmission parameter included in the received first trigger frame.

15. A communication apparatus, comprising:
a communication control unit configured to:
transmit first multiplexed downlink data to a plurality of apparatuses belonging to a wireless LAN,
receive second multiplexed downlink data from a first apparatus of the plurality of apparatuses, and
extract the first data addressed to the communication apparatus from the second multiplexed downlink data; and
a management unit configured to manage information associated with the plurality of apparatuses that has functions including:
a function of access control associated with access to the wireless LAN and including transmission of a beacon frame to each of the plurality of apparatuses, wherein
the beacon frame includes role separate information indicating roles performed by each of the plurality of apparatuses belonging to the wireless LAN, and
a function of a gateway of the wireless LAN for an external network.

* * * * *